US010375167B2

(12) United States Patent
Shamis et al.

(10) Patent No.: US 10,375,167 B2
(45) Date of Patent: Aug. 6, 2019

(54) LOW LATENCY RDMA-BASED DISTRIBUTED STORAGE

(71) Applicant: Microsoft Technology Licensing, LLC, Redmond, WA (US)

(72) Inventors: Alexander Shamis, Seattle, WA (US); Yutaka Suzue, Redmond, WA (US); Knut Magne Risvik, Mo i Rana (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 577 days.

(21) Appl. No.: 14/947,473

(22) Filed: Nov. 20, 2015

(65) Prior Publication Data
US 2017/0149890 A1 May 25, 2017

(51) Int. Cl.
*H04L 29/08* (2006.01)
*G06F 15/173* (2006.01)
*G06F 3/06* (2006.01)

(52) U.S. Cl.
CPC .......... *H04L 67/1097* (2013.01); *G06F 3/067* (2013.01); *G06F 3/0611* (2013.01); *G06F 3/0631* (2013.01); *G06F 15/17331* (2013.01)

(58) Field of Classification Search
CPC .. H04L 67/1097; G06F 3/0611; G06F 3/0619; G06F 3/0631; G06F 3/067; G06F 15/17331
See application file for complete search history.

(56) References Cited

U.S. PATENT DOCUMENTS

| 6,360,220 B1 | 3/2002 | Forin |
| 6,418,542 B1 | 7/2002 | Yeager |
| 6,697,878 B1 | 2/2004 | Imai |
| 7,403,945 B2 | 7/2008 | Lin et al. |

(Continued)

OTHER PUBLICATIONS

"Second Written Opinion Issued in PCT Application No. PCT/US2016/056224", dated Oct. 16, 2017, 6 Pages.

(Continued)

*Primary Examiner* — Viet D Vu
(74) *Attorney, Agent, or Firm* — Alleman Hall Creasman & Tuttle LLP

(57) ABSTRACT

A "Distributed Storage Controller" applies an RDMA-based memory allocator to implement a distributed thread-safe and lock-free storage system in shared memory distributed across multiple networked computers. The Distributed Storage Controller enables any number of client applications, processes, subroutines, etc., on any number of networked computers to concurrently perform self-directed lock-free allocations, de-allocations, reads, writes, etc., on the shared memory via sequences of one-way RDMA messages (e.g., RDMA reads, RDMA writes, and RDMA atomic compare and swap (CAS) operations) without requiring CPU locks. As such, the CPUs of computing devices hosting the shared memory do not need to be notified of RDMA-based reads, writes or CAS operations on that memory. Consequently, CPU utilization for computing devices hosting any portion of the shared memory is minimal, thereby enabling the Distributed Storage Controller to scale to very large numbers of concurrent accesses by very large numbers of networked computing devices.

20 Claims, 15 Drawing Sheets

Data Center or Other Network of Multiple Servers Communicating via any Combination of Switches, Routers and Direct Connections

(56) References Cited

U.S. PATENT DOCUMENTS

| | | | |
|---|---|---|---|
| 7,565,454 | B2 | 7/2009 | Zuberi |
| 7,610,348 | B2 | 10/2009 | Kisley |
| 7,617,290 | B1 | 11/2009 | Cheriton |
| 7,617,370 | B2 | 11/2009 | Jernigan, IV et al. |
| 7,702,743 | B1 | 4/2010 | Wong |
| 7,756,943 | B1 | 7/2010 | Wong |
| 7,761,619 | B2 | 7/2010 | Feng et al. |
| 7,917,597 | B1 | 3/2011 | Lentini |
| 8,155,135 | B2 | 4/2012 | Aloni et al. |
| 8,205,015 | B2 | 6/2012 | Flynn et al. |
| 8,255,047 | B1 | 8/2012 | Wohlgemuth et al. |
| 8,271,996 | B1 | 9/2012 | Gould et al. |
| 8,407,428 | B2 | 3/2013 | Cheriton et al. |
| 8,578,127 | B2 | 11/2013 | Thatcher et al. |
| 8,676,851 | B1 | 3/2014 | Nesbit et al. |
| 8,688,798 | B1 | 4/2014 | Lentini |
| 8,972,627 | B2 | 3/2015 | Strasser et al. |
| 9,058,122 | B1 | 6/2015 | Nesbit et al. |
| 9,792,248 | B2 | 10/2017 | Shamis et al. |
| 2002/0073257 | A1 | 6/2002 | Beukema et al. |
| 2002/0166078 | A1 | 11/2002 | Oldfield et al. |
| 2003/0145230 | A1 | 7/2003 | Chiu et al. |
| 2003/0202247 | A1 | 10/2003 | Niv et al. |
| 2004/0049580 | A1 | 3/2004 | Boyd et al. |
| 2004/0109234 | A1 | 6/2004 | Levola |
| 2004/0150717 | A1 | 8/2004 | Page et al. |
| 2004/0225719 | A1 | 11/2004 | Kisley et al. |
| 2009/0204755 | A1 | 8/2009 | Rushworth et al. |
| 2012/0124282 | A1 | 5/2012 | Frank et al. |
| 2012/0198284 | A1 | 8/2012 | Li |
| 2012/0233438 | A1 | 9/2012 | Bak et al. |
| 2013/0054726 | A1* | 2/2013 | Bugge .................. G06F 9/52 709/212 |
| 2013/0086183 | A1 | 4/2013 | Frank et al. |
| 2013/0159449 | A1* | 6/2013 | Taylor .................. G06F 15/167 709/212 |
| 2013/0246714 | A1* | 9/2013 | Lv .................... G06F 9/466 711/147 |
| 2013/0262384 | A1 | 10/2013 | Noguchi et al. |
| 2014/0089346 | A1 | 3/2014 | Li |
| 2014/0143368 | A1 | 5/2014 | Anderson |
| 2014/0317336 | A1 | 10/2014 | Fitch et al. |
| 2014/0325012 | A1 | 10/2014 | Guerin et al. |
| 2014/0359044 | A1 | 12/2014 | Davis et al. |
| 2014/0359145 | A1 | 12/2014 | Metzler et al. |
| 2014/0359146 | A1 | 12/2014 | Metzler et al. |
| 2015/0067086 | A1 | 3/2015 | Adriaens et al. |
| 2015/0186051 | A1 | 7/2015 | Gurajada |
| 2016/0077975 | A1 | 3/2016 | Stabrawa et al. |
| 2016/0182433 | A1 | 6/2016 | McDaid et al. |
| 2016/0308968 | A1 | 10/2016 | Friedman |
| 2016/0357702 | A1 | 12/2016 | Shamis et al. |
| 2016/0378712 | A1* | 12/2016 | Amit .................. G06F 15/17331 710/308 |
| 2017/0075856 | A1 | 3/2017 | Suzue et al. |
| 2017/0091246 | A1 | 3/2017 | Risvik et al. |

OTHER PUBLICATIONS

Bays, Carter, "A Comparison of Next-Fit, First-Fit, and Best-Fit", In Magazine of Communications of the ACM, vol. 20, Issue 3, Mar. 1977, pp. 191-192.

Behringer, Benjamin, "Memory Management for Concurrent RDMA: A Design for a Key-Value Store", In Thesis, Jun. 3, 2014, 87 pages.

Bonwick, Jeff, "The Slab Allocator: An Object-Caching Kernel Memory Allocator", In Proceedings of the USENIX Summer Technical Conference, vol. 1, Jun. 6, 1994, 18 pages.

Choi, et al., "A Remote Memory System for High Performance Data Processing", In International Journal of Future Computer and Communication, vol. 4, No. 1, Feb. 2015, pp. 50-54.

Corbet, The SLUB allocator, Published on: Apr. 11, 2007 Available at: http://lwn.net/Articles/229984/.

Dragojevic, et al., "FaRM: Fast Remote Memory", In Proceedings of 11th USENIX Symposium on Networked Systems Design and Implementation, Apr. 2, 2014, 15 pages.

Kalia, et al., "Using RDMA Efficiently for Key-Value Services", In Proceedings of ACM Conference on SIGCOMM, Aug. 17, 2014, pp. 295-306.

Mackall, Matt, "SLOB Allocator: Simple List of Blocks", Published on: Mar. 30, 2012 Available at: http://staff.osuosl.org/~bkero/slob.c.

Michael, Maged M., "Scalable Lock-Free Dynamic Memory Allocation", In Proceedings of ACM SIGPLAN Conference on Programming Language Design and Implementation, Jun. 9, 2004, pp. 1-12.

Noronha, et al., "Designing NFS with RDMA for Security, Performance and Scalability", In Proceedings of International Conference on Parallel Processing, Sep. 10, 2007, 8 pages.

Noureddine, Wael, "NFS/RDMA over 40Gbps iWARP", Retrieved on: Mar. 26, 2015, Available at: http://www.chelsio.com/wp-content/uploads/resources/SDC2014_Chelsio_NFSoRDMA.pdf.

Ongaro, et al., "Fast Crash Recovery in RAMCloud", In Proceedings of the Twenty-Third ACM Symposium on Operating Systems Principles, Oct. 23, 2011, pp. 29-41.

Ousterhout, et al., "The Case for RAMClouds: Scalable High-Performance Storage Entirely in DRAM", In Proceedings of ACM SIGOPS Operating Systems Review, vol. 43, Issue 4, Dec. 2009, pp. 1-14.

Stuedi, et al., "jVerbs: Ultra-Low Latency for Data Center Applications", In Proceedings of ACM Symposium on Cloud Computing, Oct. 1, 2013, 14 pages.

Szepesi, et al., "Designing a Low-Latency Cuckoo Hash Table for Write-Intensive Workloads Using RDMA", Retrieved on: Mar. 26, 2015, Available at: https://cs.uwaterloo.ca/~bernard/nessie.pdf.

Tanenbaum, Andrew S., "Modern Operating Systems", In Proceedings of Prentice Hall, Dec. 21, 2007, 552 pages.

Wikipedia, Memory Pool, Retrieved on: Mar. 29, 2015 Available at: http://en.wikipedia.org/wiki/Memory_pool.

International Search Report and Written Opinion Issued in PCT Application No. PCT/US16/061497 dated Feb. 2, 2017, 10 Pages.

Bonwick, et al., "Magazines and Vmem: Extending the Slab Allocator to Many CPUs and Arbitrary Resources", Retrieved From <<http://www.parrot.org/sites/www.parrot.org/files/vmem.pdf>>, Jan. 4, 2002, 20 pages.

Shaw, Peling Andrew, U.S. Notice of Allowance, U.S. Appl. No. 14/728,745, dated Jul. 5, 2017, pp. 1-8.

International Search Report and Second Written Opinion Issued in PCT Application No. PCT/US2016/050327, dated Jul. 4, 2017.

"International Search Report and Written Opinion Issued in PCT Application No. PCT/US2016/034208", dated Aug. 5, 2016, 10 Pages.

Aguilera, et al., "A Practical Scalable Distributed B-Tree", In Journal of the VLDB Endowment, vol. 1, Issue 1, Aug. 24, 2008, 12 pages.

Dragojevic, et al., "No compromises: distributed transactions with consistency, availability, and performance", In Proceedings of the 25th Symposium on Operating Systems Principles, Oct. 4, 2015, pp. 54-70.

"Mitchell, Christopher R, ""Building Fast, CPU-Efficient Distributed Systems on Ultra-Low Latency, RDMA-Capable Networks""", A Dissertation Submitted in Partial Fulfillment of the Requirements for the Degree of Doctor of Philosophy in Department of Computer Science, Courant Institute of Mathematical Sciences, New York University, Sep. 1, 2015, 110 Pages."

Shaw, Peling Andrew, U.S. Office Action, U.S. Appl. No. 14/728,745, dated Feb. 8, 2017, pp. 1-8.

International Search Report and Written Opinion Issued in PCT Application No. PCT/US2016/056224, dated Feb. 3, 2017, 11 Pages.

"International Preliminary Report on Patentability Issued in PCT Application No. PCT/US2016/050327", dated Oct. 2, 2017, 6 Pages.

"Non Final Office Action Issued in U.S. Appl. No. 14/882,357", dated May 17, 2018, 17 Pages.

(56) References Cited

OTHER PUBLICATIONS

"International Preliminary Report on Patentability Issued in PCT Application No. PCT/US2016/056224", dated Mar. 5, 2018, 6 Pages.
"Non Final Office Action Issued in U.S. Appl. No. 14/882,357", dated Jan. 4, 2019, 16 Pages.
"Non Final Office Action Issued in U.S. Appl. No. 14/852,537", dated May 3, 2019, 12 Pages.

\* cited by examiner

LOW LATENCY RDMA-BASED DISTRIBUTED STORAGE

BACKGROUND

In general, direct memory access (DMA) provides various techniques that enable a device or process of a local host computing device to directly read and write local memory of that host device without interrupting the host's CPU(s). In contrast, remote direct memory access (RDMA), which is increasingly being deployed in data centers, extends traditional DMA-based techniques to enable a remote device or process to directly read and write memory of a remote computing device without interrupting the CPU(s) of the remote computing device. Existing RDMA-based techniques, such as, for example, InfiniBand, iWARP, RDMA over Converged Ethernet (RoCE), etc., make use of RDMA-enabled network interface controller (NICs).

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

A "Distributed Storage Controller," as described herein, provides a distributed thread-safe and lock-free RDMA-based storage system in shared memory distributed across multiple networked computers. The Distributed Storage Controller enables any number of client applications, processes, subroutines, etc., that are executing on any number of networked computers to concurrently perform self-directed allocations, de-allocations, reads, writes, etc., on portions of the shared memory via various sequences of one-way RDMA messages (e.g., RDMA reads, RDMA writes, and RDMA atomic compare and swap (CAS) operations) without requiring CPU locks. As such, the CPUs of the computing devices that host the shared memory of the Distributed Storage Controller do not need to be notified of RDMA-based reads, writes or CAS operations on that shared memory. Consequently, CPU utilization relating to memory accesses for any computing device that hosts any portion of the shared memory is minimal, thereby enabling the Distributed Storage Controller to scale to very large numbers of concurrent accesses by very large numbers of networked computing devices.

In various implementations, the Distributed Storage Controller is implemented via self-directed instances of various standalone libraries (e.g., a DLL, executable code, library, etc. that are accessible via an API) that run concurrently on large numbers of networked computing devices. For purposes of discussion, networked computing devices for implementing the Distributed Storage Controller are referred to herein as controller nodes, storage nodes (also referred to as hosts), and client nodes (also referred to as clients), depending on the particular functionality being performed by those networked computing devices at any particular time. Further, any of the networked computing devices can concurrently act as any or all of the different nodes, thereby simplifying configuration of the Distributed Storage Controller.

In general, controller nodes provide various techniques for initializing the Distributed Storage Controller, registering any nodes within the network for access to the shared memory of the distributed storage provided by the Distributed Storage Controller, acting as a central repository for sharing and distributing information, including, but not limited to, a placement library (e.g., node friendly names, references or addresses to shared memory structures, etc.), distribution tables, various metadata elements, etc. In general, storage nodes host portions of the shared memory allocated by instances of an RDMA-based memory allocator component of the Distributed Storage Controller. Client nodes, or any other nodes, can then apply instances of RDMA-based messaging modules that can execute from any node (e.g., controller nodes, storage nodes, client nodes, etc.) to communicate with any storage node hosting any portion of the shared memory to perform lock-free reads and writes to the shared memory of the Distributed Storage Controller.

The self-directed nature of the Distributed Storage Controller means that once the Distributed Storage Controller has been initialized, no central computer (or multiple computers) are needed to interact with the distributed memory. However, a central computer, such as a controller node for example, is used to detect failures of storage nodes or replicas and to initiate appropriate recovery for such failures. Further, using RDMA-based messaging to manage metadata portions of each region of the shared memory enables any of the nodes to concurrently access the shared memory (e.g., concurrent allocations, de-allocations, reads, writes, and/or CAS operations) hosted on any storage node without consideration of whether any other node is concurrently attempting to access that same memory.

For example, in various implementations, each storage node that hosts any memory of the Distributed Storage Controller includes a separate reservation bitmap or the like corresponding to that particular memory. Memory write collisions are then avoided by causing any client node writing to a particular memory location to perform an RDMA CAS operation to flip a reservation bit (e.g., hosted in a reservation bitmap or the like) to reserve that memory location (e.g., "0" if free, or "1" if reserved). Once reserved by a particular node, no other node can write to that memory. Following successful completion of the write to the reserved memory, a second CAS operation (or an RDMA write) is then performed to flip the bit back so that the previously reserved memory is again available for further writes by any node.

In various implementations, the Distributed Storage Controller is implemented across multiple networked computing devices in communication via RDMA-enabled network interface cards. One or more of these networked computing devices holds distribution tables and metadata of a distributed storage. In various implementations, this distributed storage comprises a plurality of shared memory regions allocated across two or more of the networked computing devices. Further, a separate instance of an RDMA-based messaging module is hosted on each of a plurality of the networked computing devices. Further, in various implementations, a separate instance of an RDMA-based memory allocator module is hosted on each of a plurality of the networked computing devices. In various implementations, the Distributed Storage Controller applies the RDMA-based memory allocator module of one or more of the computing devices and the RDMA-based messaging module of one or more of the computing devices in combination with the distribution tables and metadata to concurrently perform any combination of lock-free memory allocations, lock-free memory de-allocations, lock-free memory reads and lock-free memory writes on the shared memory of the distributed storage.

The Distributed Storage Controller described herein provides various techniques for applying RDMA messaging to implement a distributed thread-safe and lock-free RDMA based storage system in shared memory distributed across multiple servers in an RDMA-based network. The distributed nature of the shared memory with the ability of the Distributed Storage Controller to perform lock-free operations reduces latency and improves throughput in the RDMA-based network while enabling the Distributed Storage Controller to scale to very large numbers of concurrent accesses by multiple networked computing devices. In addition to the benefits described above, other advantages of the Distributed Storage Controller will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
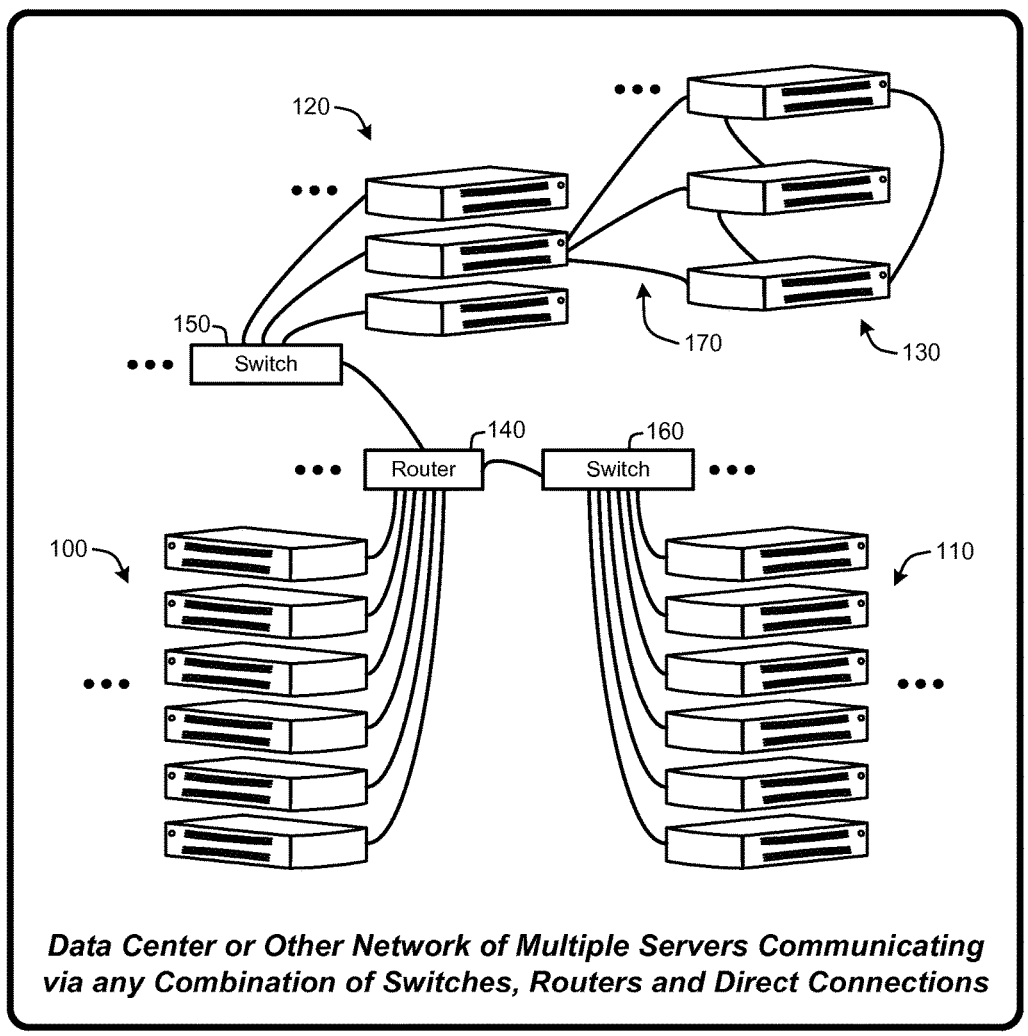
FIG. 1 illustrates an exemplary data center or other network of servers communicating via any combination of RDMA-enabled switches, routers and direct connections for use with a "Distributed Storage Controller," as described herein.

In the following description of various implementations of a "Distributed Storage Controller," reference is made to the accompanying drawings, which form a part hereof, and in which is shown by way of illustration specific implementations in which the Distributed Storage Controller may be practiced. Other implementations may be utilized and structural changes may be made without departing from the scope thereof.

Specific terminology will be resorted to in describing the various implementations described herein, and it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Distributed Storage Controller. Further, the appearance of such phrases throughout the specification are not necessarily all referring to the same implementation, and separate or alternative implementations are not mutually exclusive of other implementations. The order described or illustrated herein for any process flows representing one or more implementations of the Distributed Storage Controller does not inherently indicate any requirement for the processes to be implemented in the order described or illustrated, and any such order described or illustrated herein for any process flows do not imply any limitations of the Distributed Storage Controller.

As utilized herein, the terms "computing device," "component," "system," "client," "host," "server," and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server itself can be a component. One or more components can reside within a process and a component can be localized on one computer and/or distributed between two or more computers. Further, in the context of the Distributed Storage Controller, any of a plurality of networked servers may concurrently or separately act as either or both client computing devices and host computing devices. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

In various implementations, the Distributed Controller provides individual instances of an RDMA-based memory allocation component (e.g., a DLL, executable code, library, etc. that is accessible via an API) that executes from individual servers to enable any server in an RDMA-based network to perform allocation and/or de-allocation of shared memory (e.g., memory regions, blocks and slabs) distributed across multiple servers in that network. Further, the Distributed Storage Controller enables each of these servers to perform concurrent self-directed access to the shared memory (e.g., reads, writes, etc.) without requiring the use of a central controller or the like via various sequences of RDMA messages. Specifically, in various implementations, RDMA-based messaging is enabled by individual instances of an RDMA-based messaging component (e.g., a DLL, executable code, library, etc.) that execute from individual servers to enable any of those servers to access and interact with the shared memory distributed across the network.

In various implementations, the Distributed Storage Controller assumes a protected network where all servers have appropriate permissions to access one or more reserved regions of shared memory of other computers for allocating, de-allocating, reading and writing to the shared memory. Otherwise, an additional permission step is performed prior to performing RDMA operations (e.g., registration of nodes via a controller node, etc.) to ensure that each server has appropriate permissions to access shared memory distributed on various storage nodes throughout the network.

In various implementations, information such as a placement library, distribution tables, metadata, etc., used by one or more of the networked servers to access and interact with the shared memory is obtained from one of the servers referred to herein as a "controller node." One or more controller nodes, or controller node replicas, may be available in the network at any time. In various implementations, the controller node is also applied to initialize instances of the Distributed Storage Controller and to register nodes in the network for access to the shared memory of the distributed storage provided by the Distributed Storage Controller. Any server hosting any of the shared memory is referred to herein as a "storage node" (also referred to as a host). Further, servers initiating interactions with the shared memory (e.g., allocations, de-allocations, reads, writes, etc.), are referred to herein as "client nodes" (also referred to a client).

Any of the servers in the RDMA-based network can act as any or all of the different node types (e.g., controller node, storage node, client node, etc.) at any particular time, depending on the functionality being performed by that server. In other words, any particular server can concurrently act as a controller node, a storage node and/or a client node at any particular time with respect to any other servers in the network. However, for purposes of explanation and discussion, the various server node types will be described herein as if they were implemented on different servers.

In various implementations, any of the functionality of Distributed Storage Controller (e.g., memory allocations, reads, writes, etc.) is exposed to arbitrary client applications by individual instances of a co-processor module component (e.g., a DLL, executable code, library, etc.) of the Distributed Storage Controller that executes on individual servers. These instances of the co-processor module component enable clients to run customized applications, processes or subroutines on the distributed storage without requiring those customized applications, processes or subroutines to concern themselves with the fact that the shared memory is distributed across multiple servers. In various implementations, the co-processor module component provides these capabilities by interfacing with the aforementioned RDMA-based memory allocation component, the RDMA-based messaging component, and the RDMA-enabled NIC of the server on which the instance of the co-processor module component is executing.

In other words, the co-processor module component provides customized client applications, processes or subroutines with a simple thread-safe and lock-free interface to a very large pool of memory that can be allocated, de-allocated, read, written, erased, etc., without requiring those applications, processes or subroutines to perform any of the underlying thread-safe and lock free management of that memory provided by the RDMA-based memory allocation component and the RDMA-based messaging component of the Distributed Storage Controller. As such, the co-processor module component of the Distributed Storage Controller enables customized client applications, processes or subroutines to access the shared memory that is distributed across multiple servers as if that shared memory were local memory on the server accessing that shared memory.

Advantageously, the co-processor module component enables client applications to run on the same server on which other processes of the Distributed Storage Controller are being executed, although such processes may also be accessed by remote client applications running on other servers. For example, the co-processor module component enables client applications to run on any client node while that client node is performing any of the operations described herein. Consequently, the co-processor module component further reduces any latency that would result from remote accesses to the functionality of the Distributed Storage Controller by enabling those client applications to execute on the same physical or virtual machine as various processes of the Distributed Storage Controller. In addition, the co-processor module component can aggregate local information on any node, thereby avoiding or reducing any need for remote access.

As illustrated by FIG. 1, the Distributed Storage Controller may be configured for use with any desired network configuration including any combination of servers (100, 110, 120 and 130) communicating via any combination of RDMA-enabled routers 140, switches (150 and 160), and direct connections 170. Advantageously, the communications and messaging techniques enabled by the Distributed Storage Controller are scalable to any number of networked computers and any number of concurrent allocations, de-allocations, reads, writes, etc., on memory distributed on servers throughout the network.

1.1 System Overview:

As mentioned above, the Distributed Storage Controller provides various techniques for applying RDMA messaging to implement a distributed thread-safe and lock-free RDMA based storage system in shared memory distributed across multiple servers in an RDMA-based network.

Figure 2:
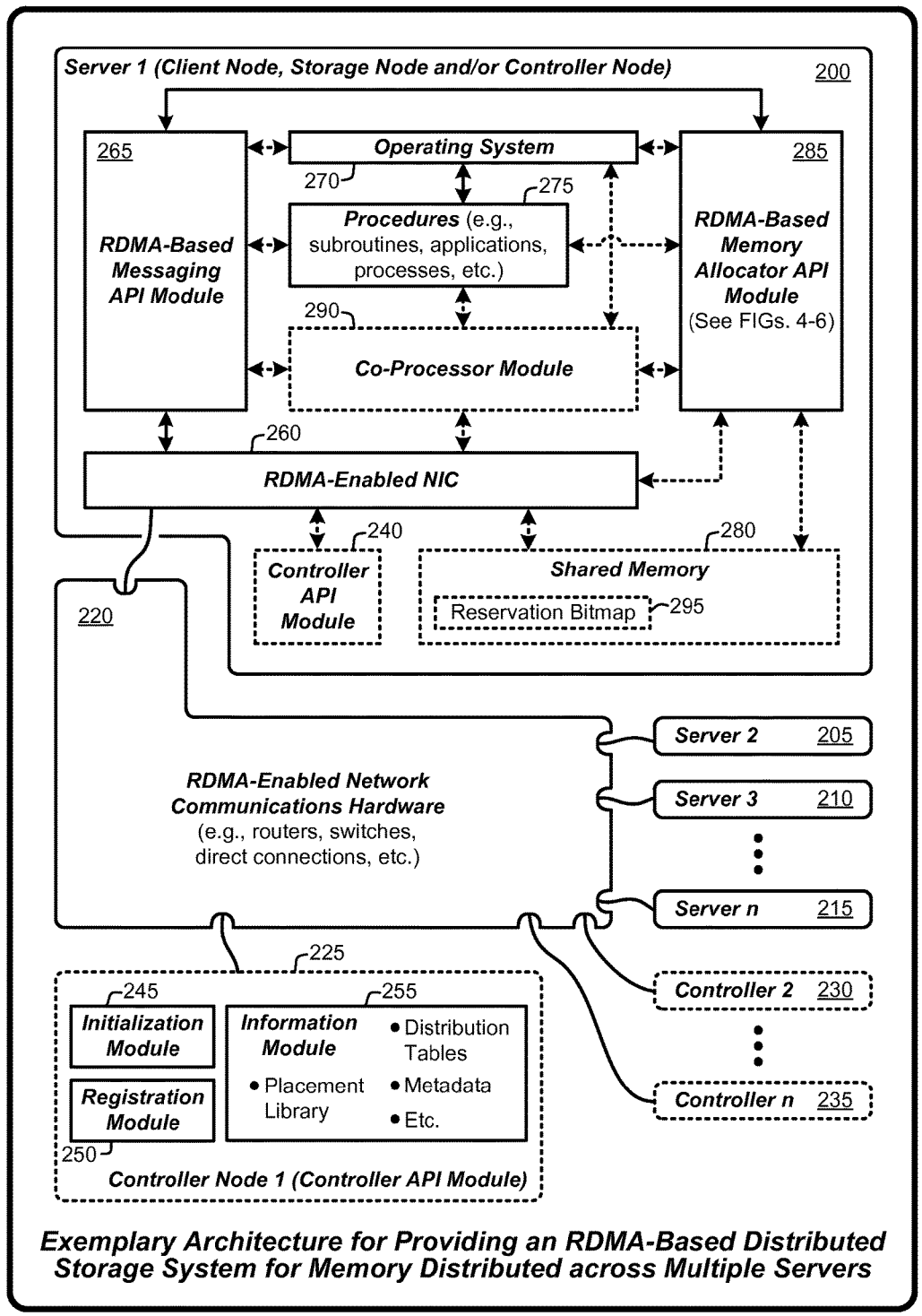
FIG. 2 illustrates a general architectural diagram for applying the Distributed Storage Controller to provide an RDMA-based distributed shared memory.

The processes summarized above are illustrated by the general architectural diagram of FIG. 2. More specifically, FIG. 2 illustrates a high-level exemplary architecture of the Distributed Storage Controller that shows various implementations of the Distributed Storage Controller. However, FIG. 2 is not intended to provide an exhaustive or complete illustration of every possible implementation of the Distributed Storage Controller as described throughout this document. In addition, any boxes and interconnections between boxes that may be represented by broken or dashed lines in FIG. 2 represent alternate implementations of the Distributed Storage Controller described herein. Further, any or all of these alternate implementations, as described herein, may be used in combination with other alternate implementations that are described throughout this document.

In particular, a plurality of servers (200, 205, 210, and 215) are configured as a network via RDMA-enabled network communications hardware 220 such as a router, switch, or other networking hardware or infrastructure. Each of the servers (200, 205, 210, and 215) may concurrently operate as any or all of a "controller node" (e.g., initializing the Distributed Storage Controller, registering servers for access to the shared memory of the distributed storage provided by the Distributed Storage Controller, providing information and metadata for use in interacting with the Distributed Storage Controller, etc.), a "storage node" (hosting a portion of the distributed shared memory) and a "client node" (e.g., allocations, de-allocations, reads, writes, etc., on the distributed shared memory) with respect to any of the other servers in the network. In addition, as discussed in further detail below, in various implementations, one or more servers in the network may act as dedicated controller nodes (225, 230, and 235) by providing a subset of the functionality of the networked servers (200, 205, 210, and 215).

In general, each controller node, whether implemented as a controller node API (240) executing on one of the servers (200, 205, 210, and 215) or as a dedicated controller node (225, 230 and 235) includes the same basic functionality. In particular each controller node includes, but is not limited to, an initialization module 245, a registration module 250, and an information module 255, all of which can communicate with any other computing devices in the network via its own RDMA-enabled NIC 260 and its own local instance of an RDMA-based messaging API module 265.

In various implementations, the initialization module 245 component of the controller node initializes the overall Distributed Storage Controller. For example, in various implementations, a controller node resides at an address that is known by (or published to) each of the other nodes of the overall Distributed Storage Controller. Once the controller node is operational (e.g., fully booted or initialized), each of the other nodes in the network (which may also include one or more replicas of the controller node) contact the controller node to report their status as ready (e.g., operational and available to participate in the overall distributes storage system. Once all of these the nodes have indicated that they are ready, the controller sends a message to all the other nodes that all of the participating nodes are ready. At this time, the controller node also sends a copy of a current distribution table that defines where all of the memory regions are located, as discussed in further detail in the following paragraphs.

In particular, the registration module 250 component of the controller node communicates with each server (200, 205, 210, and 215) and optional dedicated controller nodes (225, 230 and 235) in the network to admit or register each of those computing devices to access the shared memory of the distributed storage provided by the Distributed Storage Controller.

Further, the information module 255 component of the controller node provides a variety of information to servers (200, 205, 210, and 215) and optional dedicated controller nodes (225, 230 and 235). For example, in various implementations, the information module 255 provides information that allows any authorized computing device in the network to interact with the Distributed Storage Controller including, but not limited to, a placement library, distribution tables, metadata, etc.

In general, the distribution table is a table that maps a virtual memory region to one or more physical memory regions residing on one or more storage nodes. As discussed in further detail herein, in various implementations, each physical memory region is a 2 GB section of memory that is registered on a particular storage node. In various implementations, each virtual region is mapped to a collection of multiple memory regions (e.g., multiple replicas) that exist on different storage nodes, in different failure domains, so that if a single storage node goes offline or is otherwise unavailable, there are multiple backups of the virtual regions. When writing (or reading) a particular memory region, those writes (or reads) are to a virtual region and use the distribution table which routes the write or read to one of the multiple corresponding physical memory regions on one of the storage nodes. Further, because each virtual region is mapped to a collection of multiple memory regions that exist on different storage nodes, this enables any particular physical memory region (or entire storage nodes) to be added, lost, removed, swapped, etc., at any time by simply updating the distribution table to refer to a new storage node for a particular memory region.

When accessing or interacting with any shared memory 280 or shared memory structure (e.g., key-value stores, databases, etc.) enabled by the Distributed Storage Controller, client nodes may obtain information including, but not limited to, addresses or references to any particular memory or memory structure via a placement library, distribution tables, metadata, etc., from the information module of one or more controller nodes. In general, the placement library provides a mechanism to place and discover the location of the particular memory structures (e.g., key-value stores, databases, etc.), via a friendly name or other identifier associated with the memory or memory structure. The placement library, and/or the entire controller node, may be hosted on any server and optionally replicated.

In various implementations, each of the servers (200, 205, 210, and 215) and optional dedicated controller nodes (225, 230 and 235) is configured to run an operating system (e.g., 270), which in turn may allow execution of one or more procedures 275, e.g., subroutines, applications, processes, etc. As mentioned above, an instance of the RDMA-based messaging API module 265 resides on each server (200, 205, 210, and 215) and on each optional dedicated controller node (225, 230 and 235), and is applied to enable communications between each computing device in the network, including, but not limited to obtaining information from controller nodes and performing RDMA-based reads, writes and CAS operations on shared memory 280 distributed on any server acting as a storage node in the network via the RDMA-enabled NIC 260 of each server.

As mentioned above, portions of the distributed shared memory 280 may be hosted by any or all of the servers (200, 205, 210, and 215) and optional dedicated controller nodes (225, 230 and 235). In various implementations, the shared memory 280 of the Distributed Storage Controller is managed and distributed across multiple computing devices by individual instances of an RDMA-Based Memory Allocator API Module 285 that resides on each server (200, 205, 210, and 215). The RDMA-Based Memory Allocator API Module 285 is applied to intercept and handle any memory allocation and de-allocation requests from the operating system 270, procedures 275 and/or individual instances of an optional co-processor module 290 executing on each particular server (200, 205, 210, and 215).

In various implementations, whenever any client node writes to any shared memory 280 location, that client first reserves that memory location via a reservation bitmap 295 or the like by flipping a corresponding bit via an RDMA CAS operation. In various implementations, the reservation bitmap 295 is hosted in or in conjunction with the region of the shared memory 280 being addressed by the write operation. However, the reservation bitmap may optionally be implemented as a global reservation bitmap or other data structure (not shown). In either case, the reservation bitmap 295 is applied to reserve any particular memory slab for writing to a particular memory location within that memory slab by any particular client node.

The use of local reservation bitmaps 295 for the shared memory 280 of each server acting as a storage node simplifies the reservation process since any knowledge of the address of any particular shared memory location will inherently provide the address of the corresponding reservation bitmap on the server hosting that shared memory. However, by using some additional record-keeping functionality (e.g., tracking whether a server is online or otherwise operational, addressing potential reservation request races between different servers for the same node, etc.), one or more optional global instances of the reservation bitmap 295 for the entire Distributed Storage Controller (or particular memory structures or portions the distributed shared memory) may be hosted on any server and optionally replicated. In this case, the location or address of the global reservation bitmap can be obtained from one of the controller nodes via the aforementioned placement library.

As mentioned above, in various implementations, the co-processor module 290 provides a connection library (e.g., a DLL, executable code, library, etc. that is accessible via an API) that allows any desired functionality (e.g., a key-value store or other client application) to access and interact with the memory allocation and shared memory features of the Distributed Storage Controller via thread-safe and lock-free RDMA-based messaging. In particular, the co-processor module 290 interfaces with either or both the RDMA-based messaging API module 265 and the RDMA-Based Memory Allocator API Module 285, in combination with the RDMA-enabled NIC 260 of the server on which the instance of the co-processor module component is executing to provide transparent access to the underlying functionality of the overall Distributed Storage Controller.

2.0 Operational Details of the Distributed Storage Controller:

The above-described program modules are employed for enabling various implementations of the Distributed Storage Controller. As summarized above, the Distributed Storage Controller provides various techniques for applying RDMA messaging to implement a distributed thread-safe and lock-free RDMA based storage system in shared memory distributed across multiple servers in an RDMA-based network. The following sections provide a detailed discussion of the operation of various implementations of the Distributed Storage Controller, and of exemplary methods for implementing the program modules and features described in Section 1 with respect to FIG. 1 and FIG. 2. In particular, the following sections provides examples and operational details of various implementations of the Distributed Storage Controller, including:

An operational overview of the Distributed Storage Controller;
RDMA messaging;
Nodes of the Distributed Storage Controller;
Co-processor module;
Memory regions and allocations into bocks and slabs
RDMA-based memory allocations and de-allocations;
RDMA-based reads of shared memory;
RDMA-based writes to shared memory;
RDMA-based RPC messaging;
Replicating server nodes across multiple computing devices; and
Exemplary applications.

2.1 Operational Overview:

As mentioned above, the Distributed Storage Controller provides various techniques for applying RDMA messaging to implement a distributed thread-safe and lock-free RDMA-based storage system in shared memory distributed across multiple servers in an RDMA-based network. In various implementations, this shared memory is allocated from memory regions that are partitioned into memory blocks by a block-allocator component of the RDMA-based memory allocator component of the Distributed Storage Controller. Further, each allocated memory block is divided into equal sized memory slabs by slab allocator components of the RDMA-based memory allocator component of the Distributed Storage Controller. In general, the size of memory regions, blocks, and slabs may vary based on various considerations, as discussed in further detail herein. However, in various implementations, each memory slab (each containing a plurality of memory elements, e.g., bits, bytes, or other subsections of the memory slab) are limited to a maximum size that can be fully read via a single RDMA read and fully written via a single RDMA write.

The shared memory provided by the Distributed Storage Controller is distributed throughout multiple servers in the network. As a result, no one server is required to handle the load for large volumes of concurrent allocations, de-allocations, reads, writes, etc., on the shared memory, thereby reducing server load and latency for interactions with the shared memory. Therefore, otherwise heavy network traffic for the shared memory is mitigated by the distributed and self-directed nature of access to that shared memory. Advantageously, the lock-free nature (e.g., no CPU locks) of allocations and accesses to the shared memory improves overall performance of the Distributed Storage Controller by reducing latency associated with large numbers of concurrent allocations, de-allocations, reads and writes of the shared memory by multiple networked computers. Further, the ability of the messaging techniques described herein to use commodity RDMA-based NICs reduces networking costs relative to networks based on specialized NIC hardware.

In addition, networks implemented using the Distributed Storage Controller are very flexible in that any server acting as a client node (e.g., reading and writing to the shared memory and optionally requesting memory allocations and/or de-allocations) with respect to one or more storage nodes (e.g. hosting some portion of the distributed shared memory) may concurrently be acting as a storage node or controller node with respect to one or more other client nodes, storage nodes, or controller nodes. In other words, the Distributed Storage Controller is easily scalable to multiple simultaneous, concurrent, or sequential requests from servers acting as any or all of a controller node, a storage node, and a client node, thereby improving network performance.

In various implementations, the RDMA messaging capability of the Distributed Storage Controller is enabled by a connection library or the like that provides an application programming interface (API) for use of RDMA-based messaging via the RDMA-enabled NICs of each server. This connection library encapsulates various protocols to both establish and maintain connections between the NICs of any number of networked computers. Any application or process running on any server may access the API to interface with the Distributed Storage Controller to perform allocations, de-allocations, reads and writes on the shared memory. The API will then automatically initiate communication between servers via RDMA-enabled NICs to process such memory requests.

The use of RDMA-enabled NICs to process allocations, de-allocations, and read and write requests enables the Distributed Storage Controller to apply "kernel bypass" techniques that further reduce CPU load on the server for accesses to the shared memory. Kernel bypass is a concept that is applied to improve network performance by carrying out various operations and memory reads and writes without access or notification to the kernel. For example, in a typical networking scenario, the kernel decodes network packets, e.g., TCP, and passes the data from the kernel space to "user space" by copying it. The term "user space" refers to code which runs outside the kernel (e.g., outside kernel space). User space typically refers to various programs and libraries that the OS uses to interact with the kernel, such as, for example, software that performs input/output, manipulates file system objects, application software etc. The copy process from kernel space to user space typically involves saving user space process context data and then loading kernel context data. This step of saving the user space process context data and then loading the kernel process information is typically referred to as context switch. However, application context switching has been observed to constitute a large fraction of network overhead, thereby reducing bandwidth and latency performance of computer interconnects.

The Distributed Storage Controller adapts various kernel bypass techniques to enable user space applications to communicate with the Distributed Storage Controller, which is adapted to communicate both with user space applications and the NIC on the computing device on which the Distributed Storage Controller is executing. This process takes the kernel out of the path of communication between the user space process and an I/O subsystem enabled by the Distributed Storage Controller that handles network communication via the RDMA enabled NICs. Advantageously, this configuration eliminates context switching and copies from kernel space to user space. For example, in various implementations, the Distributed Storage Controller generally transmits RDMA reads, writes, and CAS operations via the following order of user space operations:

1. Make a determination on a local server acting as a client node that an RDMA message is to be transmitted to a remote server acting as a storage node for hosting some portion of the shared memory. In general, this determination is made in response request to allocate, de-allocate, read or write to the shared memory received or otherwise intercepted by the Distributed Storage Controller;
2. Apply a local instance of the Distributed Storage Controller on the client node to communicate with the NIC of the client;
3. Apply the NIC of the client node to communicate with physical networking hardware (e.g., RDMA-enabled switches, routers, etc.) of the network to send the appropriate RDMA message (e.g., various sequences of reads, writes and CAS operations) across the network to the NIC of the storage node (e.g., the computer hosting a particular regions, block or slab of the shared memory being allocated, de-allocated, read, written, etc.); and
4. In response to receipt of the RDMA message by the NIC of the storage node, applying that NIC to perform the requested read, write, or CAS operation on memory of that storage node via DMA operations between that NIC and the memory on that storage node. In other words, each server performs local DMA operations (e.g., reads, writes, and CAS operations) in response to RDMA messages received by its NIC from other servers.

For example, in various implementations, an application, process, or thread executing on one of the networked client nodes initiates a request to perform an allocation, de-allocation, read or write on the shared memory. In various implementations, the Distributed Storage Controller receives or otherwise intercepts that request, either directly or via the aforementioned co-processor module, and performs various sequences of RDMA reads, write, and CAS operations to implement the requested memory operation.

Advantageously, the actual process, thread, or application making the read or write request may not necessarily be aware of, or care, that the distributed shared memory enabled by the Distributed Storage Controller exists on a different server (or multiple servers) in the network. That process, thread, or application simply makes use of the memory references obtained from any source (e.g., controller node, co-processor module, custom client application, etc.) to perform any desired operation on that memory via the various components of the Distributed Storage Controller. In other words, various combinations of RDMA reads, writes and CAS operations are used in combination with references to the address of particular memory locations to allocate, de-allocate, read and/or write to that memory. As such, the Distributed Storage Controller provides these networked servers with fast lock-free access to a shared memory distributed within a significantly larger memory space (across multiple servers) than would be possible by accessing only local server memory.

2.2 RDMA Messaging:

As mentioned previously, remote direct memory access (RDMA) is a direct memory access from the memory of one computer into the memory of a different computer that is performed via the RDMA-enabled network interface controllers (NICs) of those computers without involving the operating system of either computer. In other words, RDMA operations are performed directly by the NICs reading and writing to server memory without any interruption or notification to the CPU of either server. For example, the NIC of a client node (or controller node) sends an RDMA message or request to the NIC of the storage node. Any storage node receiving an RDMA message or request then applies its own NIC to interact with its own local memory via corresponding local direct memory access (DMA) operations between the NIC of that storage node and the memory of that storage node to service the received RDMA request. However, for purposes of explanation, the following discussion will simply refer to the use of RDMA messages or requests sent between various servers to implement a distributed thread-safe and lock-free RDMA based storage system in shared memory distributed across multiple servers in an RDMA-based network.

Whenever any RDMA message is transmitted across the network between any two NICs that RDMA message includes a message checksum value computed by the sending NIC and verified on receipt by the receiving NIC. In particular, the receiving NIC re-computes the message checksum from the received message contents and compares that re-computed checksum to the checksum in the received RDMA message. If the checksums match, then the RDMA message is presumed to have been received correctly. If the checksums do not match, then it is assumed that the RDMA message has been somehow corrupted during the transmission from the sender to the receiver.

In various implementations, the Distributed Storage Controller makes use of various RDMA verbs to enable reads and writes on the shared memory and to provide RDMA-based allocations and de-allocations of the shared memory. For example, in various implementations, these RDMA verbs include, but are not limited to, various sequences of RDMA writes, RDMA reads, and RDMA atomic compare and swap (CAS) operations.

RDMA reads enable any client node to read a section of memory of any storage node via the RDMA NICs of those servers without the operating system of the storage node being aware of that memory read. Similarly, RDMA writes enable any client node to write to a section of memory of any storage node via the RDMA NICs of those servers. As with RDMA reads, RDMA write operations are performed with no notification to the CPU of the storage node. Further, depending on the processes being performed by the client node, the CPU of the client node may or may not be notified or involved in portions of any reads or writes to any storage node.

The RDMA atomic compare and swap (CAS) operation is used to atomically compare a value in the RDMA CAS message from a first server to a value of a specified virtual address of a second server. If the compared values are equal, a value specified by the RDMA CAS message will be stored at the virtual address of the second server as an atomic transaction. In other words, in an atomic transaction, a series of database operations either all occur, or nothing occurs. A guarantee of atomicity prevents updates to the memory address occurring only partially. Consequently, the RDMA transaction is not observed to be in progress by the receiving server because at one moment in time, it has not yet happened, and at the next moment, it has already occurred in whole (or nothing happened if the transaction failed due to a mismatch of the sent value and the value held by the receiving server).

In various implementations, the Distributed Storage Controller applies RDMA CAS operations, in combination with metadata obtained via RDMA reads of particular blocks, regions and/or slabs of the shared memory, to reserve particular memory slabs prior to performing RDMA writes to that memory, and to allocate and/or de-allocate particular memory regions, memory blocks and memory slabs for use by the Distributed Storage Controller by modifying metadata block headers and free slab maps of the allocated memory via RDMA CAS operations on those block headers and free slab maps, as discussed in further detail in the following paragraphs.

Further, a remote procedure call (RPC) is an inter-process communication that allows a computer program, process, or thread running on one computer to cause a subroutine or procedure to execute in an address space of a different computer on a shared network. Typically, to execute an RPC, one server sends an RPC request to another server. The RPC request includes an ID of a particular procedure (e.g., a subroutine, application, process, etc.) to be executed by the server and one or more optional parameters to be used for execution of that procedure. In various implementations, a "cookie" or the like may also be sent along with the ID. In general, this cookie is an identifier (e.g., number, name, etc.) that uniquely identifies the server sending the RPC request in a way that enables the original message sent by that server to be matched to the response that is eventually received by the sending server from the server that originally received the RPC request.

As mentioned above, in various implementations, the Distributed Storage Controller performs allocations, de-allocations, reads and writes on the shared memory using RDMA-based messaging. As such, these memory allocations and accesses are performed without involving the CPU of the server hosting the shared memory. However, in various implementations, the Distributed Storage Controller combines RDMA messaging and RPC requests to perform various functions, including, but not limited to, retrieval of information from controller nodes (e.g., server cluster information, metadata, placement libraries, distribution tables, etc.), replication of controller nodes, storage nodes, and/or particular memory locations or memory structures, etc. In addition, in various implementations, various combinations of RDMA messaging and RPC requests is applied to perform memory allocations, de-allocations, reads and/or writes on the shared memory. In such cases, the CPUs of the client and host servers only become involved when they access the shared memory in response to an RPC request or execute a memory allocation or de-allocation request specified by an RPC request transmitted between the client and the host servers via RDMA-based messaging.

Figure 3:
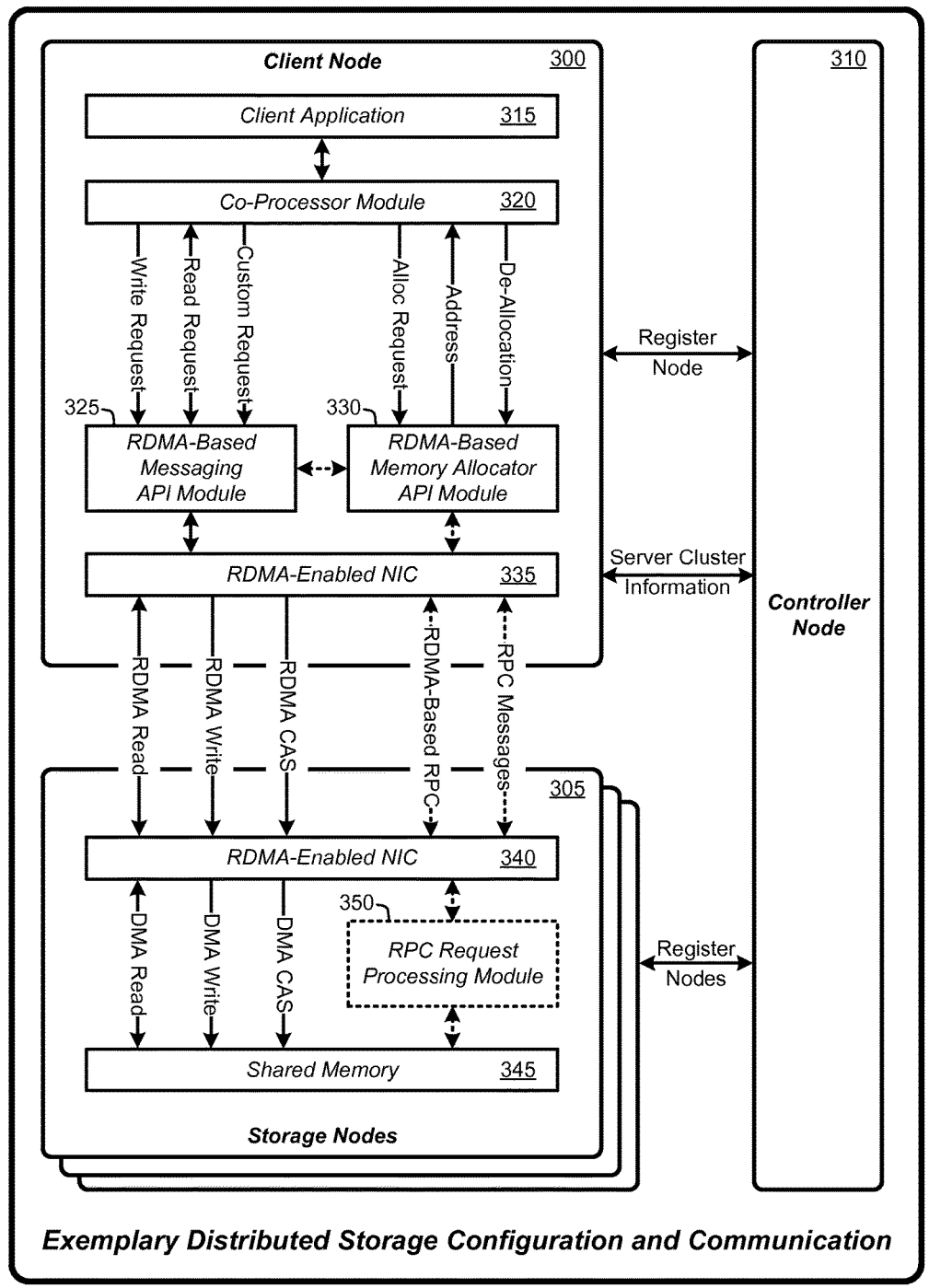
FIG. 3 illustrates a general architectural diagram for that shows exemplary communication between various nodes of the Distributed Storage Controller.

FIG. 3 illustrates a general architectural diagram for that shows an exemplary configuration and communication between various nodes of the Distributed Storage Controller. FIG. 3 is not intended to provide an exhaustive or complete illustration of every possible implementation of the Distributed Storage Controller as described throughout this document. In addition, any boxes and interconnections between boxes that may be represented by broken or dashed lines in FIG. 3 represent alternate implementations of the Distributed Storage Controller described herein. Further, any or all of these alternate implementations, as described herein, may be used in combination with other alternate implementations that are described throughout this document.

For example, as illustrated by FIG. 3, one or more client nodes 300 are in communication with one or more storage nodes 305 and one or more controller nodes 310 via RDMA-enabled NOCs (e.g., 335, 340) of each of these nodes. As illustrated, both the client node 300 and the storage nodes 305 register via the controller node 310 (via NICs of each node) so as to become authorized to access the shared memory of other nodes in the network. In addition, the client node 300 may contact the controller node 310 in order to retrieve server cluster information (e.g., names and/or addresses of servers (e.g., controller nodes, storage nodes, and client nodes) registered to participate in the shared memory of the Distributed Storage Controller, memory distribution tables, metadata, etc.).

In the example illustrated in FIG. 3, client node 300 includes an arbitrary client application 315 that interfaces with the functionality of the Distributed Storage Controller via a co-processor module 320. The co-processor module 320 intercepts various memory requests (e.g., write requests, read requests, custom memory access requests, memory allocation requests, memory de-allocation requests, etc., from the client application 315 and passes those requests to either or both an RDMA-based messaging module 325 and an RDMA-based memory allocator module 330.

The RDMA-based messaging module 325 and/or the RDMA-based memory allocator module 330 then apply the RDMA-enabled NIC 335 of the client node 300 to pass various sequences of RDMA reads, RDMA writes, RDMA CAS operations, RDMA-based RPC messages, RPC messages, etc., to the RDMA-enabled NIC of one or more storage nodes 305 in order to service the original memory access request of the client application 315. The RDMA-enabled NIC of those storage nodes 305 then perform various sequences of local DMA operations (e.g., DMA reads, DMA writes, and DMA CAS operations) corresponding to the RDMA messages received from the client node 300 on local shared memory 345 of the storage nodes 305.

In the case that RPC messages are received by the storage nodes 305, either via RDMA writes of RPC messages to a message buffer or as a direct RPC message from the client node 300, an RPC request processing module is applied to perform whatever task is requested by the RPC message. In this case, unlike processing of RDMA messages by the NIC 340, the CPU of the storage nodes 305 may become involved in servicing those RPC messages.

2.3 Nodes of the Distributed Storage Controller:

As mentioned previously, the Distributed Storage Controller includes, but is not limited to, a collection of servers, any or all of which can concurrently operate as any combination of controller nodes, storage nodes and client nodes.

2.3.1 Controller Nodes:

In general, the controller node exists at an address that is known by or published to all of the nodes of any type. Further, the controller node maintains a current operational status of each node (e.g., storage nodes, client nodes, other controller nodes, and replicas of any type of node) and is capable of communicating with and being addressed by all of the nodes of any type via various combinations of RDMA and/or RPC messaging. The overall Distributed Storage Controller can operate with a single primary controller node. However, in various implementations, additional system redundancy is provided by replicating the functionality and information of the primary controller node to one or more additional controller nodes. Replicas may be accessed either upon failure of the primary controller node or to relieve congestion on the controller node.

In various implementations, controller nodes operate as dedicated servers implementing a controller API module. Alternately, controller nodes can operate as any combination of controller nodes, storage nodes, and client nodes by executing a local instance of the controller API module. Regardless of whether or not the controller node is implemented as a dedicated server or as a component of a storage node and/or client node, on startup, the controller node performs operations including, but not limited to, evaluating the network to ensure that there are a sufficient number of networked computing devices available to support the Distributed Storage Controller and that RDMA-based communications with those machines are functioning within expected parameters.

In general, the functionality of the controller node includes, but is not limited to, keeping track of which nodes (and replicas) in the cluster are healthy, maintaining current versions of the distribution tables that are up to date with which machines are healthy, providing the distribution tables to any node that requests this information, and saving and distributing any additional information that is intended to be globally or highly accessible to the various nodes. A simple example if information that is intended to be accessible is the mapping of a B-Tree name to an address of a head node of that B-Tree in shared memory hosted by the various storage nodes. In various implementations, the Distributed Storage Controller applies various protocols including, but not limited to, Paxos or ZooKeeper for information that is intended to be globally or highly accessible. In general, Paxos is a well-known family of protocols for solving consensus in a network of unreliable processors. Similarly, ZooKeeper is well-known software that provides an open source distributed configuration service, synchronization service, and naming registry for large distributed systems.

2.3.2 Storage Nodes:

In general, storage nodes host portions of the shared memory of the Distributed Storage Controller. There are typically many storage nodes in the network, depending on the size of the network and the desired amount of shared memory that is to be made available. Typically, every storage node is a different physical machine. In various implementations, the Distributed Storage Controller uses virtual machines for implementation of storage nodes. However, physical machines tend to be faster than virtual machines for implementing the storage nodes.

In various implementations, the shared memory hosted by storage nodes is allocated and de-allocated by instances of RDMA-based memory allocation modules that can execute from any node (e.g., controller nodes, storage nodes, client nodes, etc.) in the network to perform lock-free RDMA-based allocations and de-allocations of memory on any storage node in the network. Further, this shared memory may be replicated across multiple computing devices across the network for redundancy and reduction of network congestion. Further, the co-processor module component of the Distributed Storage Controller may also execute on storage nodes.

2.3.3 Client Nodes:

In general client nodes apply instances of RDMA-based messaging modules that can execute from any node (e.g., controller nodes, storage nodes, client nodes, etc.) to communicate with any controller nodes and any storage nodes hosting any portion of the shared memory to perform lock-free reads and writes to the shared memory of the Distributed Storage Controller. In addition, client nodes apply instances of RDMA-based memory allocator modules that can execute from any node to perform allocations and de-allocations of shared memory on any storage node in the network. In addition, as discussed in further detail below, in various implementations, client nodes may include instances of a co-processor module that provides an interface to any or all of the functionality of the Distributed Storage Controller for use by any client application, procedure, process, subroutine, thread, etc. Further, a client node can optionally be run on computers that are not inside of a Distributed Storage Controller cluster but are connected to that cluster via a network that supports RDMA.

2.4 Co-Processor Module:

As mentioned above, in various implementations, client nodes include a co-processor module that provides a connection library (e.g., a DLL, executable code, library, etc. that is accessible via an API) that allows any desired functionality (e.g., a key-value store or other client application) to access and interact with the memory allocation and shared memory features of the Distributed Storage Controller via thread-safe and lock-free RDMA-based messaging. For example, in various implementations, the co-processor module provides a wrapper that enables the Distributed Storage Controller to run client applications or code within the actual cluster, thereby reducing latency of access to the shared memory of the cluster. Examples of such client applications or code include, but are not limited to map-reduce jobs, Spark jobs, search index serving jobs, machine-learning jobs, etc.

In other words, in various implementations, the shared memory of the Distributed Storage Controller is managed by an RDMA-based memory allocator that can be addressed by customized client applications via the co-processor module. After any memory has been allocated for use by the Distributed Storage Controller, the Distributed Storage Controller enables any node, and any co-processor-based application executing on any node, to make use of that shared memory via thread-safe and lock-free accesses to the shared memory via various sequences of RDMA messaging enabled by the RDMA-based messaging module. For example, an implementation of a key-value store enabled by the co-processor module is described in Section 2.11 of this document.

2.5 Memory Regions and Allocations into Blocks and Slabs:

As mentioned above, multiple servers (e.g., storage nodes) in the network host one or more memory regions of the distributed shared memory that is reserved for and accessible by the various components of the Distributed Storage Controller. Reserving these memory regions for use by the Distributed Storage Controller ensures that any authorized servers in the network, or other processes executing on those servers, do not write to memory regions of the reserved memory except via the various components of the Distributed Storage Controller, thereby avoiding conflicts or corruption of memory managed by the Distributed Storage Controller. The reserved memory on any particular storage node is then only accessed by the Distributed Storage Controller via DMA read, write, and CAS operations on that memory by the NIC of that storage node in response to RDMA messages sent by the NIC of some client node.

In general, each memory region is defined as a contiguous section of memory that is reserved for use by the Distributed Storage Controller. In various implementations, a memory region size of 2 GB was used, with one or more of these regions being reserved on any of the networked servers. However, memory regions of any desired size may be used based on the techniques described herein. These reserved memory regions are directly addressable by RDMA-enabled NICs in response to RDMA reads, writes and CAS operations transmitted and received by the RDMA-enabled NICs of each server.

Further, each individual memory region contains a section of memory (e.g., one or more memory blocks) reserved for metadata in the form of block headers and a free slab map. In various implementations, the size of block header and the size of the free slab maps may be the same sizes as the blocks into which each region is divided. However, there is no requirement that block headers be the same size as free slap maps, or that either of these are the same sizes as the blocks in the same memory region. In addition, depending on memory region size and the amount of metadata in block headers and free slab maps, multiple block header sections and multiple free slab maps may be included in any particular memory region.

In various implementations, the metadata of the block headers comprises information including, but not limited to, an indication of whether each block in a particular memory region is free or allocated, slab sizes for each allocated block, a count of the number of allocated slabs (or a count of the number of free slabs) in each allocated block of the memory region, a reservation bitmap for reserving particular memory slabs for writes, etc. The free slab map comprises metadata including, but not limited to, a bitmap or other metadata, indicating whether each individual slab in each of the memory blocks of a particular memory region are free or allocated (e.g., "0" if free, or "1" if used or allocated for any particular slab).

In various implementations, the remainder of each memory region (other than the metadata sections) is divided into equal sized blocks by block allocators of the RDMA-Based Memory Allocator. However, the block size in different memory regions may be different from that of other memory regions, depending on system configuration. Similarly, in various implementations, each memory block is divided into equal sized memory slabs by slab allocators of the RDMA-based memory allocator component of the Distributed Storage Controller. However, the slab size in different blocks may be different from that of other blocks, depending on system configuration. As mentioned above, in various implementations, each the size of each slab is limited to a maximum size the enable the entire slab to be read via a single RDMA read operation or written via a single RDMA write operation.

In various implementations, the block allocator component of the RDMA-based memory allocator component reserves two or more of the first blocks in its memory region for metadata. The first group of blocks, which are at least one block, contain the block headers for the entire memory region. These block headers contain the shared information needed for the RDMA-based memory allocator to perform lock-free operations. The next group of blocks is the free slab map for all of the allocatable blocks in the memory region. The amount of blocks used for this metadata is based on the number of blocks, block size and the maximum number of slabs in a block. In other words, memory blocks are allocated from the memory region by block allocator components of the RDMA-based memory allocator component of the Distributed Storage Controller.

Each block allocator is responsible for allocating and de-allocating blocks from within a particular region. The block allocator is also responsible for setting a block's size and marking a block as un-used (via the block header associated with that block) when there are no more used slabs in a block. In various implementations, the block allocator applies a "best fit" allocation strategy to find space in the next appropriately sized slab and/or block. This results in a trade-off between an increase in internal fragmentation and latency of the system.

These block allocators are instantiated as needed by the RDMA-based memory allocator component of the Distributed Storage Controller and set the size of the blocks being allocated from the memory region. In various implementations, block size was set to 1 MB. However, there is no requirement that blocks be any particular size, and as such, block size can be any desired size up to the entire size of the memory region (less the portion of the memory region reserved for metadata).

Similarly, memory slabs are allocated from memory blocks by slab allocator components of the RDMA-based memory allocator API. These slab allocators are instantiated as needed by any block allocator associated with a particular memory region. In general, slabs are the smallest unit in the allocator and it is the actual individual allocation unit that can be allocated for memory reads and writes. As noted above, the size of slabs may differ between different blocks, but is typically the same size within individual blocks.

For example, in various implementations, possible slab sizes are set anywhere between one byte and one megabyte (or whatever the maximum block size has been set to, with intermediate sizes of increasing powers of 2 (e.g., 2 bytes, 4 bytes, 8 bytes, 16 bytes, 32 bytes, 64 bytes, 128 bytes, 256 bytes, etc., with a maximum slab size corresponding to maximum RDMA read and write sizes enabled by the NIC hardware). Allocating the same size slabs within individual blocks makes it a simple matter to compute references to allocated slabs by simply determining an offset based on the slab count in the block. However, by including additional metadata in either the free slab map or the block header to allow determination of references to reserved slabs, the slabs can be set at any desired size within blocks.

Figure 4:
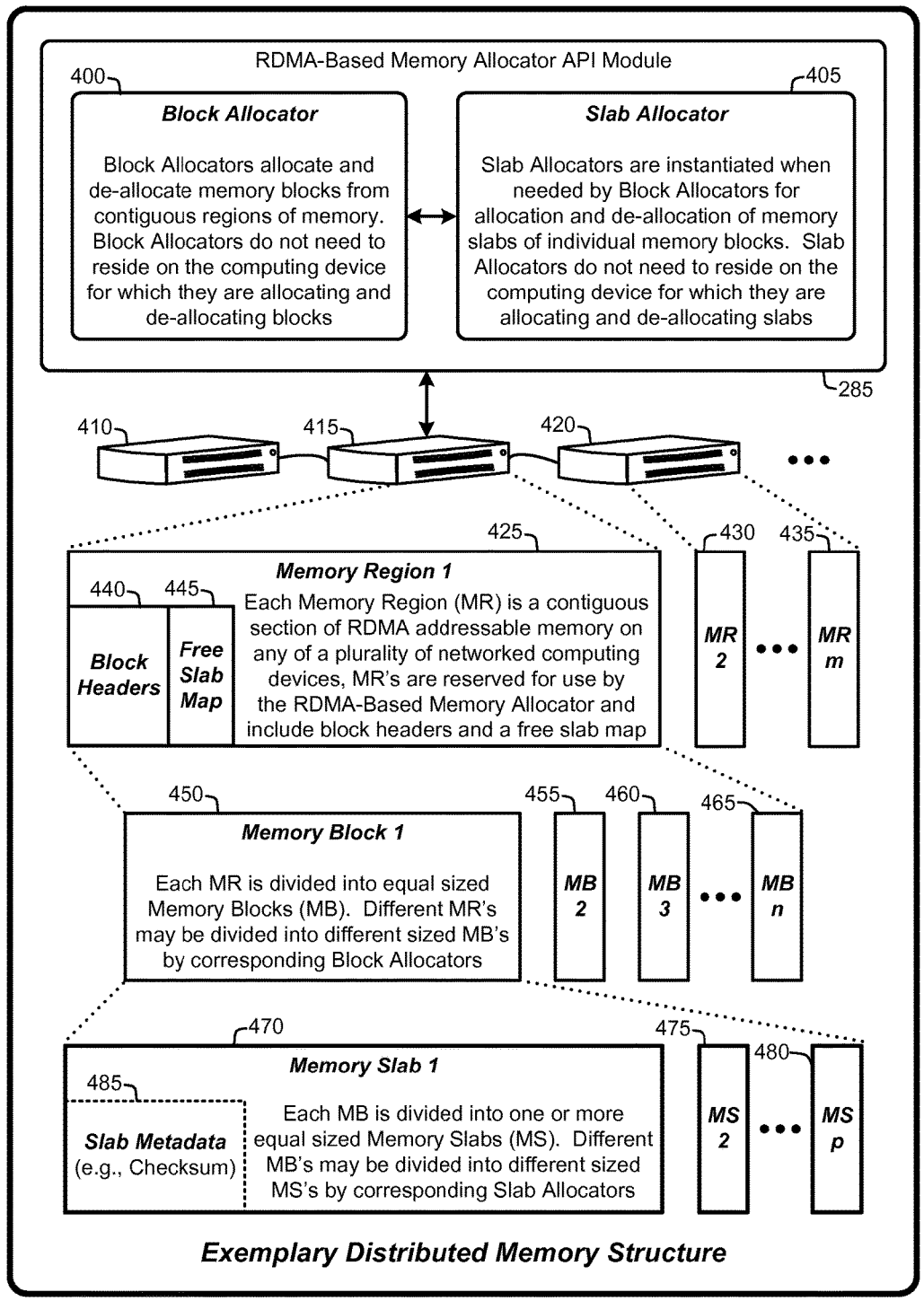
FIG. 4 illustrates an exemplary distributed memory structure controlled by the Distributed Storage Controller.

FIG. 4 illustrates an exemplary distributed memory structure of memory regions divided into a metadata section including block headers for use by the various components of the Distributed Storage Controller. For example, as illustrated by FIG. 4, the RDMA-based memory allocator API module 285 (also shown as corresponding element 285 in FIG. 2) instantiates one or more block allocators 400 and slab allocators, on as as-needed basis. As noted above, the block allocators 400 allocate and de-allocate memory blocks from contiguous regions of memory. Further, block allocators 400 do not need to reside on the computing device for which they are allocating and de-allocating blocks. Similarly, slab allocators 405 are instantiated when needed by block allocators 400 for allocation and de-allocation of memory slabs of individual memory blocks. As with the block allocators 400, the slab allocators 405 do not need to reside on the computing device for which they are allocating and de-allocating slabs.

Further, as illustrated by FIG. 4, the RDMA-based memory allocator API 285 resides on one or more networked computing devices or servers (410, 415, and 420). One or more of these networked computing devices or servers (410, 415, and 420) hosts one or more memory regions (425, 430, 435) that is reserved for use by the Distributed Storage Controller. Each memory region (425, 430, 435) is a contiguous section of RDMA addressable memory on any of the networked computing devices. Further, each memory region (425, 430, 435) includes block headers 440 and a free slab map 445.

In addition, as illustrated by FIG. 4, in various implementations, each memory region (425, 430, 435) is divided into one or more equal sized memory blocks (450, 455, 460, 465). Different memory regions (425, 430, 435) may be divided into different sized memory blocks (450, 455, 460, 465) by corresponding block allocators 400.

Finally, as illustrated by FIG. 4, in various implementations, each memory block (450, 455, 460, 465) is divided into one or more equal sized memory slabs (470, 475, 480). Different memory blocks (450, 455, 460, 465) may be divided into different sized memory slabs (470, 475, 480) by corresponding slab allocators 405. In various implementations, a portion of each slab is reserved for metadata 485. In various implementations, this metadata 485 includes an optional checksum computed from each memory element (e.g., bits, bytes, or other subsections) of each memory slab (470, 475, 480). As discussed in further detail herein, in various implementations, this slab checksum is applied to verify integrity of the data in the memory slab (470, 475, 480) at the level of the entire slab when reading the slab. Further, as also discussed in further detail herein, in various implementations, this checksum is re-computed by the Distributed Storage Controller and written to the slab as a part of any write to any memory element of the slab. The use of the checksum in this manner enables the Distributed Storage Controller to perform concurrent lock-free reads and writes to memory slabs, using the aforementioned reservation bitmap for reserving particular memory slabs for writes.

2.6 RDMA-Based Memory Allocations and De-Allocations:

Shared memory is distributed and managed across multiple computing devices by the aforementioned RDMA-based memory allocator component of the Distributed Storage Controller (e.g., see FIG. 2 (RDMA-Based Memory Allocator API Module (285), FIG. 4, and FIGS. 5 and 6, discussed below). The following paragraphs describe this RDMA-based memory allocation process.

In general, the RDMA-based memory allocator component of the Distributed Storage Controller applies remote direct memory access (RDMA) messaging to provide fast lock-free memory allocations and de-allocations for shared memory distributed across multiple servers in an RDMA-based network. Alternately, in various implementations, the RDMA-based memory allocator component of the Distributed Storage Controller combines RDMA messaging and remote procedure call (RPC) requests to provide fast lock-free memory allocations and de-allocations for shared memory distributed across multiple servers in an RDMA-based network. In either case, any of the networked servers can act as either or both a client node for requesting (or releasing) memory allocations and a host or storage node for hosting a portion of the distributed memory. Further, any server (including the requesting client node and controller nodes) may act as the host for the distributed memory being allocated or de-allocated by any client node via RDMA messaging.

Memory allocations and de-allocations are accomplished via a distributed memory allocator comprising multiple instances of block allocators and slab allocators that are instantiated when needed by the block allocators. The block allocators and slab allocators generally apply RDMA read messages to determine status of particular memory blocks and memory slabs as used or free from metadata (e.g., block headers and free slab maps) associated with each memory block. In addition, the block allocators and slab allocations apply RDMA atomic compare and swap (CAS) messages to allocate or de-allocate those blocks and/or slabs based on the metadata retrieved via the RDMA read messages. In other words, block allocators perform allocations and de-allocations in combination with slab allocators via a sequence of RDMA read and CAS messages transmitted between servers via RDMA-enabled NICs to read and modify a block header and a free slab map associated with each memory block. After memory slabs have been allocated using this process, any client node can read or write to any allocated slab hosted by any storage node by applying RDMA reads and writes directed to a reference to the allocated slab. More specifically, a client node NIC sends an RDMA message to the NIC of a storage node. The storage node then performs corresponding DMA operations on its own local memory to complete the RDMA request of the client node.

Figure 5:
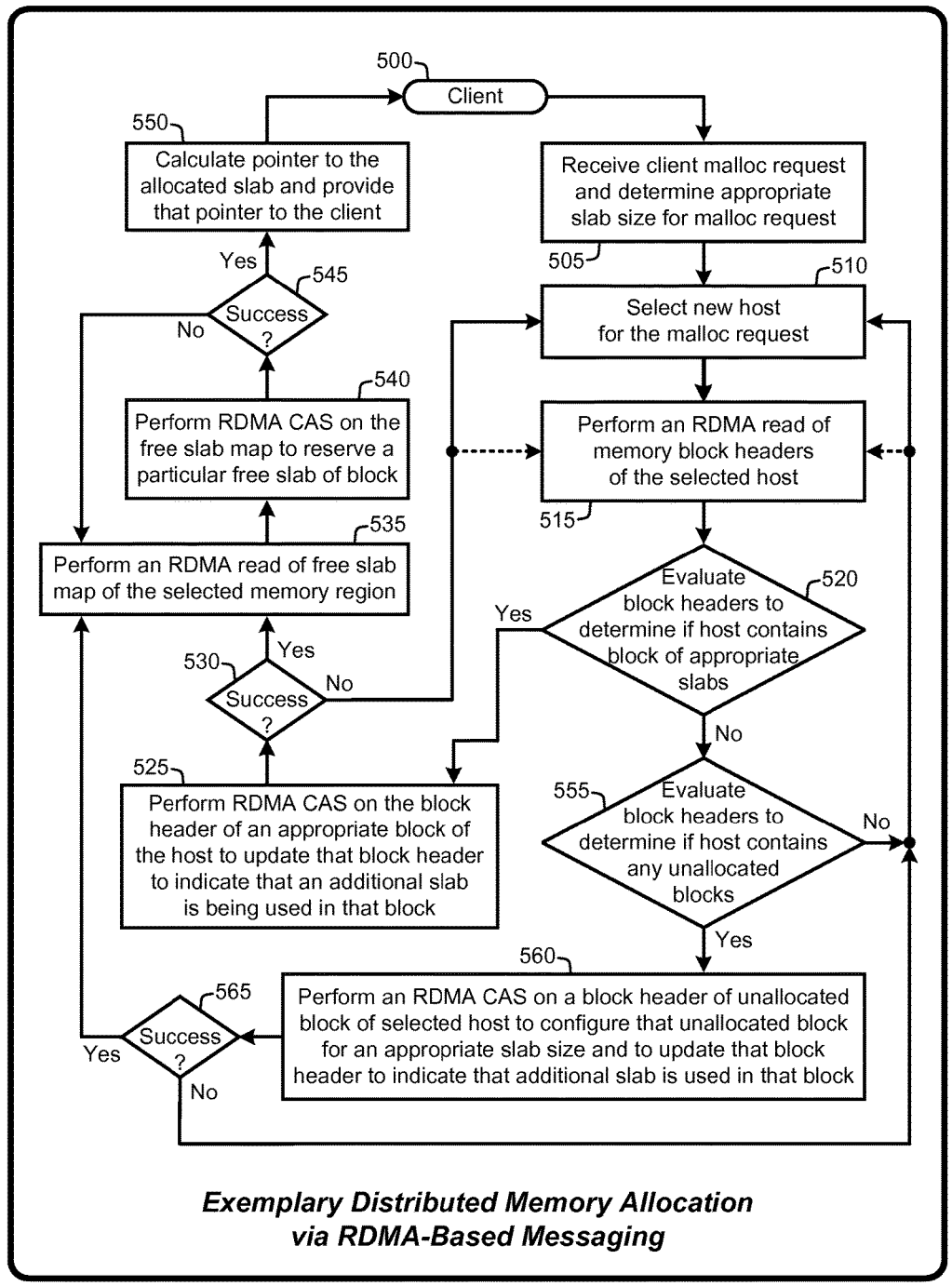
FIG. 5 illustrates a general flow diagram that illustrates various exemplary techniques for effecting RDMA-based distributed memory allocations.

FIG. 5 illustrates various implementations of the RDMA-based memory allocation features of the RDMA-based memory allocator component of the Distributed Storage Controller of the Distributed Storage Controller. Furthermore, while the system diagram of FIG. 5 illustrates a high-level view of various implementations of the Distributed Storage Controller, FIG. 5 is not intended to provide an exhaustive or complete illustration of every possible implementation of the Distributed Storage Controller as described throughout this document. In addition, any boxes and interconnections between boxes that may be represented by broken or dashed lines in FIG. 5 represent alternate implementations of the Distributed Storage Controller described herein. Further, any or all of these alternate implementations, as described herein, may be used in combination with other alternate implementations that are described throughout this document.

In general, as illustrated by FIG. 5, the memory allocation processes enabled by the RDMA-based memory allocator component of the Distributed Storage Controller begin operation by receiving 505 a memory allocation (malloc) request from a client 500, and determining a memory size for an appropriate slab size for that malloc request. The size of this malloc request is generally based on a request by some application, process, thread, etc., of the client node 500 for some particular amount of memory. Although not a requirement, in various implementations, slab size is generally set to be equal to or less than the maximum size that can be read or written via a single RDMA read or write, thus enabling entire slabs to be read or written with a single RDMA read or write operation. The RDMA-based memory allocator component then selects 510 a particular host and/or memory region from which to service the malloc request of the client 500. In response to the client malloc request, the RDMA-based memory allocator component performs 515 an RDMA read of the portion of the selected memory region that contains the block headers for that memory region. The RDMA-based memory allocator component then evaluates 520 these block headers to determine if that memory region of the host contains any allocated blocks of appropriately sized memory slabs (e.g., slabs of a size that are suitable for the intended malloc request).

Assuming that suitably sized memory slabs are available in one or more blocks of the selected memory region, the RDMA-based memory allocator component then performs 525 an RDMA CAS operation on the block header of a selected one of those blocks with suitably sized slabs (referred to as an "appropriate block"). This CAS operation serves to update the block header of the appropriate block to indicate that an additional slab is being used in that block. In other words, the count of free slabs in the appropriate block is decreased by one via successful completion 530 of this RDMA CAS operation on the block header. In the case the multiple appropriate blocks exist for a particular slab size within the selected memory region, in various implementations, selection of the particular appropriate block is based on various selection methodologies, including, but not limited to, "best fit" allocation strategies, random selection, selection based on block address order, etc.

Furthermore, upon successful completion of the RDMA CAS to update the appropriate block header to decrement the number of free slabs, the RDMA-based memory allocator component then performs 535 an RDMA read of the free slab map of the selected memory region. Next, given the free slab map, the RDMA-based memory allocator component selects one of the free slabs in the appropriate block and performs 540 an RDMA CAS operation on the free slab map to update the free slab map to show the selected slab as being allocated (e.g., change 0 to 1 in the free slab map to indicate that the selected free slab is now an allocated slab). In other words, if successful 545, this CAS operation on the free slab map reserves a selected free slab of the appropriate block by updating the corresponding entry in the free slab map. In response to a successful 545 reservation of the slab via the CAS message, the RDMA-Based Memory Allocator API calculates 550 a reference to the allocated slab and provides that reference to the client 500, thus completing the malloc request.

As mentioned above, the client evaluates 520 block headers received via the an RDMA read 515 of the block headers of the selected host to determine if the host contains any blocks of appropriately sized memory slabs. In the case that suitably sized memory slabs are not available in one or more blocks of the host, the client further evaluates 555 those block headers to determine whether the host holds any free or unallocated blocks (e.g., memory blocks that have not yet been reserved for a particular slab size, meaning that the block has not yet been divided into slabs, and is therefore available for allocation). In this case, assuming that the host contains one or more free blocks, the client performs 560 an RDMA CAS operation on the block header of a selected one of the free blocks to reserve or allocate that block. If successful 565, this CAS operation configures the selected free block for the appropriate slab size by updating the metadata in the corresponding block header to specify the slab size for that block and to decrement the number of free slabs in that block by one. Once this previously free block has been configured for the appropriate slab size, the RDMA-based memory allocator component then proceeds to reserve one of the slabs in the newly configured block via the above-described sequence of performing 535 the RDMA read of the free slab map, performing 540 the RDMA CAS operation on the free slab map, and calculating 550 and providing the corresponding reference to the client 500 to complete the malloc request.

As mentioned above, following the evaluation 520 to determine whether the host contains blocks of appropriately sized slabs, the RDMA-based memory allocator component performs 525 a CAS operation on the block header of a selected appropriate block. However, in the event that this CAS operation is not successful 530 for some reason (e.g., prior reservation via a malloc request by some other client), in various implementations, the RDMA-based memory allocator component restarts the malloc process by selecting 510 a new host for the malloc request. However, memory is typically allocated at relatively high frequencies in the host in response to requests by the same or other clients. Consequently, in various implementations, rather than selecting 510 a new host, the RDMA-based memory allocator component restarts the original malloc request on the same host by performing 515 a new RDMA read of the block headers for the originally selected memory region. In either case, as illustrated by FIG. 5, the restarted malloc process then continues as discussed above.

Similarly, if the evaluation 555 to determine whether the host contains any free or unallocated blocks indicates that no unallocated blocks are available, in various implementations, the RDMA-based memory allocator component restarts the malloc process by either selecting 510 a new host for the malloc request, or repeating the performance 515 of the RDMA read of the memory block headers of the selected host. As illustrated by FIG. 5, the restarted malloc process then continues as discussed above.

Similarly, as discussed above, under various circumstances, the RDMA-based memory allocator component performs 560 an RDMA CAS operation on the block header of a selected one of the free blocks to reserve or allocate that block. However, in the event that this CAS operation is not successful 565 for some reason (e.g., prior reservation via a malloc request by some other client), in various implementations, the RDMA-based memory allocator component restarts the malloc process by either selecting 510 a new host for the malloc request, or repeating the performance 515 of the RDMA read of the memory block headers of the selected host. As illustrated by FIG. 5, the restarted malloc process then continues as discussed above.

Figure 6:
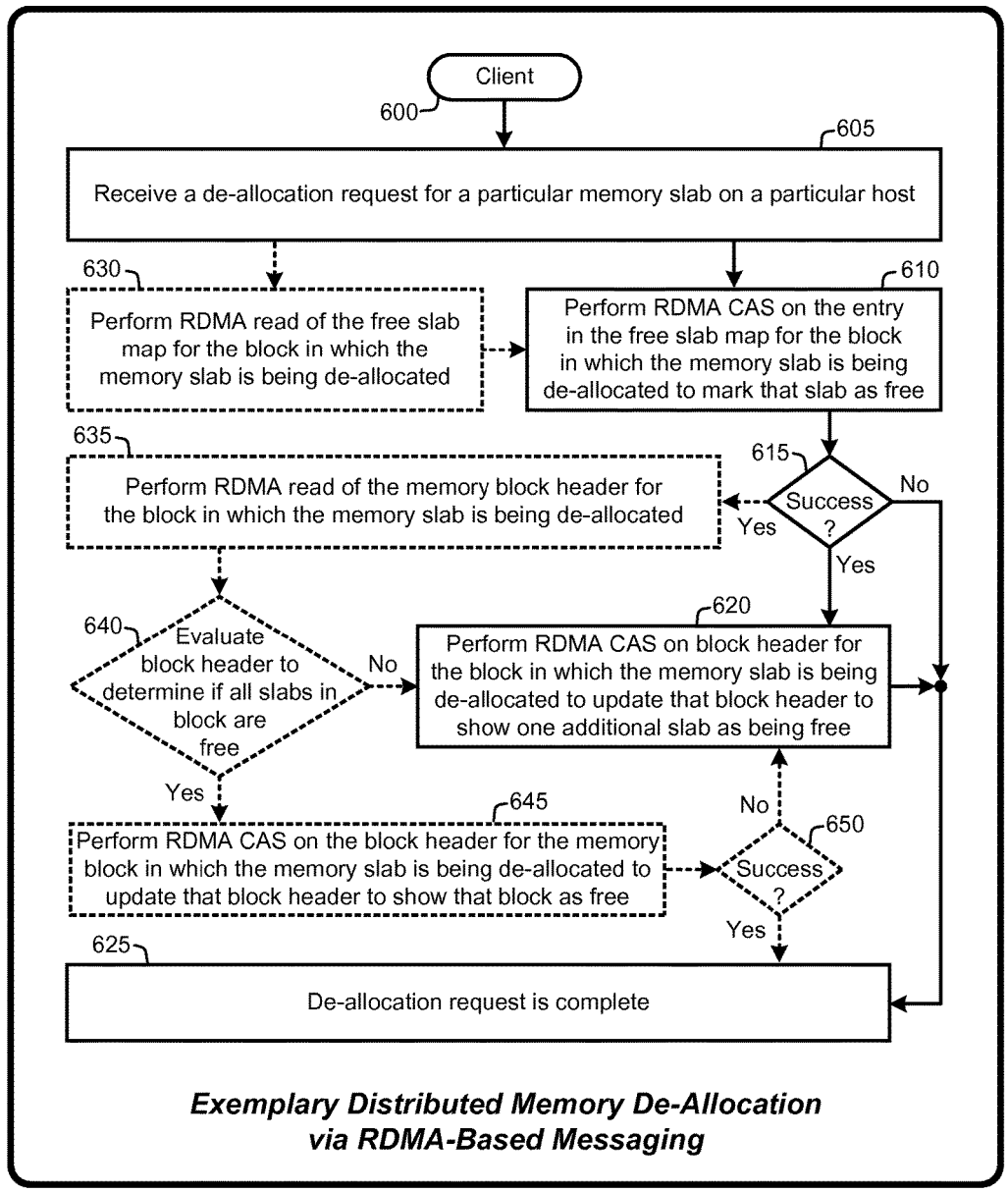
FIG. 6 illustrates a general flow diagram that illustrates various exemplary techniques for effecting RDMA-based distributed memory de-allocations.

The system diagram of FIG. 6 illustrates various implementations of the memory de-allocation features of the RDMA-based memory allocator component of the Distributed Storage Controller, as described herein. Furthermore, while the system diagram of FIG. 6 illustrates a high-level view of various implementations of the Distributed Storage Controller, FIG. 6 is not intended to provide an exhaustive or complete illustration of every possible implementation of the Distributed Storage Controller as described throughout this document. In addition, any boxes and interconnections between boxes that may be represented by broken or dashed lines in FIG. 6 represent alternate implementations of the Distributed Storage Controller described herein. Further, any or all of these alternate implementations, as described herein, may be used in combination with other alternate implementations that are described throughout this document. In addition, the de-allocation processes illustrated by FIG. 6 may be combined with the allocation processes illustrated by FIG. 5 to perform concurrent and ongoing memory allocations and de-allocations for shared memory distributed across the network.

In various implementations, the memory de-allocation process begins with the RDMA-based memory allocator component of the Distributed Storage Controller receiving 605 or otherwise intercepting a de-allocation request from a client 600. This de-allocation request is directed to a particular memory slab on a particular host. In response to the de-allocation request, in various implementations, the RDMA-based memory allocator component performs 610 an RDMA CAS operation on the entry in the free slab map relating to the particular slab that is being de-allocated to update the free slab map to mark that slab as being free (e.g., change 1 to 0 in the free slab map to indicate that the selected allocated slab is now a free slab). In the case that this RDMA CAS operation is not successful 615, then the particular slab is already marked as free (e.g., in response to a prior de-allocation request from some other client or process in the network), and the de-allocation request is complete 625. However, in the event that this CAS operation is successful 615, in various implementations, the RDMA-based memory allocator component performs 620 an RDMA CAS operation on the block header for the block in which the memory slab is being de-allocated to show one additional slab as being free in that block (e.g., increment the number of free slabs by 1 in the corresponding block header). At this point, the de-allocation request is complete 625.

In various implementations, prior to performing the initial CAS operation 610, the RDMA-based memory allocator component first performs 630 an RDMA read of the free slab map for the block in which the memory slab is being de-allocated. The information in the free slab map is then used to perform the aforementioned CAS operation 610 on the free slab map.

As noted above, in the case that the RDMA CAS operation 610 is successful 615, the RDMA-based memory allocator component can perform the aforementioned RDMA CAS operation 620 on the block header to complete 625 the de-allocation request. However, in various implementations, the RDMA-based memory allocator component performs additional operations to determine whether the corresponding block contains any allocated slabs following the de-allocation, and whether that entire block can therefore be marked as free in the corresponding block header.

In particular, following successful 615 completion of the RDMA CAS operation 610 on the free slab map, in various implementations, the RDMA-based memory allocator component performs 635 an RDMA read of the block header for the block in which the memory slab is being de-allocated. The RDMA-based memory allocator component then evaluates 640 the block header to determine whether all of the slabs in the block are free (e.g., slab count in the metadata will show zero allocated slabs following de-allocation of the particular slab). In the event that one or more of the other slabs in that block are still allocated, the RDMA-based memory allocator component simply performs 620 the aforementioned RDMA CAS on that block header to show one additional slab as being free to complete 625 the de-allocation request.

However, in the event that the block will have no allocated slabs following de-allocation of the particular slab, the RDMA-based memory allocator component instead performs 645 an RDMA CAS operation on the block header for the block in which the slab is being de-allocated to mark the entire slab as being free. Upon success 650 of this CAS operation 645, the de-allocation request is complete 625. However, in the event that this CAS operation 645 fails (e.g., some other client or process reserves or allocates an additional slab from the block before the block is freed), the RDMA-based memory allocator component simply performs 620 the aforementioned RDMA CAS operation on that block header to show one additional slab as being free to complete 625 the de-allocation request.

In general, as soon as a previously allocated slab or block of memory is de-allocated, that slab or block immediately becomes available for further allocations by the RDMA-based memory allocator component. Further, in various implementations, in the case that all slabs in a particular block have been de-allocated, the RDMA-based memory allocator component maintains the existing slab size for that block rather than marking the block as free. This further decreases the latency of memory allocations in the case that the existing slab size for that block is of a size that is likely to be frequently used. However, in cases of uncommon slab sizes, or limited memory resources, it may be more advantageous to mark the entire block as free following de-allocation of all slabs in that block. Generally, the decision to mark blocks as free in such cases will depend on the particular application, network traffic profiles, and the availability of additional free memory regions for further allocations.

2.6.1 Distributed Memory Allocation Considerations:

As mentioned above, the RDMA-based memory allocator component of the Distributed Storage Controller performs allocations of shared memory distributed across a network. Further, references to allocated memory are provided to clients for use in reading and writing to allocated memory slabs. The following paragraphs discuss some of the considerations of various implementations for applying the RDMA-Based Memory Allocator API to perform memory allocations based solely on RDMA messaging. Further, a discussion of memory allocation using combinations of RDMA and RPC is provided below in Section 2.9.

In various implementations, the RDMA-based memory allocator component of the Distributed Storage Controller operates under several constraints, none of which is mandatory, for purposes of simplifying overall system configuration and reducing both bandwidth and latency for performing memory allocations. For example, in various implementations, the RDMA-Based Memory Allocator API enforces a maximum allocation size (e.g., 2 GB memory regions, 1 MB blocks, slab sizes less than or equal to maximum RDMA read and write sizes, etc.) that is specified during initial setup of the Distributed Storage Controller on any particular network.

In various implementations, the RDMA-based memory allocator component uses a predetermined or static overhead for allocations. For example, consider a 2 GB memory region size for allocations. In this case, the RDMA-based memory allocator component may use a static amount of that memory region (e.g., 0.1 GB) for metadata and the remainder (e.g., 1.9 GB) for block allocations. However, in various implementations, the RDMA-Based Memory Allocator API applies a variable overhead size for metadata based on the size of regions, block sizes, and number of and size of slabs in each block.

An additional constraint in various implementations is that once memory has been reserved, that memory is not moved. This ensures that the allocated memory is accessible via RDMA reads and writes. Further, in various implementations, the RDMA-based memory allocator component does not use any kind of blocking code (e.g., critical sections, wait for single object, etc.) because the underlying kernel code would introduce considerably more latency than RDMA reads, writes, or CAS operations. However, even though latency may increase, the use blocking code may be applied in various implementations of the Distributed Storage Controller to address particular network considerations for specific applications.

The following discussion summarizes communication between two networked computers (e.g., "Client" and "Host") during an exemplary memory allocation by the RDMA-based memory allocator component of the Distributed Storage Controller. The following sequence of events is not intended to describe or include all of the various implementations of the RDMA-based memory allocator component, and is provided only for purposes of example.
1. Client (computer A) determines the following information: where the memory region that it wants to allocate memory from is located (e.g., computer B, Host), and the desired allocation size. Consider that computer A can be the same computer as computer B, but does not have to be the same as computer B. In other words, this allocation process may be applied on a single computer acting as both Client and Host, or between different computers.
2. The Client performs an RDMA read of the block headers in the memory region on the Host.
3. The Client evaluates the block headers and determines one of the following:
   (a) The memory region of the Host contains an appropriate block from which to allocate the memory slab;
   (b) There are no appropriate allocated blocks on the Host, but there are one or more unallocated blocks on the Host; or
   (c) There are no appropriate allocated blocks on the Host and there are no unallocated blocks on the Host.
4. Based on the determination in Step 3, the Client will perform one of the following actions:
   (a) If 3(a), then the Client will perform an RDMA CAS operation on the block header of the selected block on the Host, this CAS operation will update the block header to indicate that an additional slab is being used in that block;
   (b) If 3(b), then the Client will perform an RDMA CAS on the header of an unallocated block on the Host to allocate that block, this CAS operation will initialize all of the metadata in the corresponding block header including indicating that an additional slab is being used in that block;
   (c) If 3(c), then the Client will fail the allocation. In response to this failure, several options are possible.
      i. Return an allocation error to the Client (or whatever process, thread or application on the Client made the initial malloc request);
      ii. Return to Step 1. Memory allocations are dynamic. Therefore, it is possible that one or more blocks or slabs have become available on the Host since the allocation failure; or
      iii. Return to Step 2. Memory allocations are dynamic. Therefore, it is possible that one or more blocks or slabs have become available on the Host since the allocation failure.
5. Assuming that the Client successfully performs Step 4(a) or Step 4(b), the Client will then perform an RDMA read of the free slab map of the Host.
6. In response to Step 5, the Client will evaluate the free slab map to identify an unallocated slab, and will then reserve that unallocated slab via an RDMA CAS operation on the free slab map of the Host to update the corresponding slab entry as being used.
7. In response to Step 6, the RDMA-based memory allocator component computes a reference to the allocated slab and provides that reference to the Client to complete the malloc operation.

2.6.2 RDMA-Based Memory De-Allocation Considerations:

In the case of memory de-allocations, in various implementations, the RDMA-based memory allocator component again operates with the shared memory distributed across two or more networked computing devices. The RDMA-based memory allocator component intercepts or otherwise receives a de-allocation request for a particular memory slab on a particular one of the networked computing devices acting as a host. In various implementations, the RDMA-Based Memory Allocator then performs an RDMA CAS on a portion of the free slab map corresponding to a particular memory block of the host in which the memory slab is being de-allocated. This RDMA CAS updates the free slab map to mark the slab being de-allocated as free. Finally, in various implementations, the RDMA-based memory allocator component performs an RDMA CAS on a memory block header of the particular memory block of the host to update that block header to show one additional slab as being free.

The following discussion summarizes communication between two networked computers during an exemplary memory de-allocation by the RDMA-based memory allocator component. The following sequence of events is not intended to describe or include all of the various implementations of the RDMA-based memory allocator component, and is provided only for purposes of example.

1. Client (computer A) determines the following information: where the memory region that it wants to de-allocate memory from is located (e.g., computer B, Host). Consider that computer A can be the same computer as computer B, but does not have to be the same as computer B. In other words, this de-allocation process may be applied on a single computer acting as both Client and Host, or between different computers.
2. The client performs an RDMA read the free slab map for the memory region in which the slab is being de-allocated.
3. The Client performs an RDMA CAS operation on the free slab map of the Host to mark the slab being de-allocated as free.
4. The Client then performs an RDMA read of the block header of the Host for the block in which the slab is being de-allocated.
5. The Client evaluates the number of reserved or allocated slabs indicated by the block header and determines one of the following case-based scenarios:
    (a) There are no other slabs in use in the block besides the slab being de-allocated; or
    (b) There are other slabs being used in the block.
6. Based on the determination of Step 5, the Client will then perform one of the operations:
    (a) If 5(a), then the Client will perform an RDMA CAS operation on the block header of the Host so as to update the block header to show the entire block as being free (i.e., unallocated);
    (b) If 5(b), then the Client will perform an RDMA CAS operation on the block header of the Host so as to update the block header to show that there is one less slab being used in the that block.
7. Following successful completion of Step 6, the de-allocation is complete and the previously allocated slab (or block) is available for further allocations.

2.6.3 Allocations and De-Allocations without Free Slab Maps:

As discussed above, memory allocations and de-allocations (and optional replications) may be performed by the RDMA-based memory allocator component of the Distributed Storage Controller via RDMA-based messaging and/or RDMA-based RPC messages. In each of these cases, the preceding discussion referenced the use of a free slab map for allocations and de-allocations of particular memory slabs. However, in various implementations, slab management (e.g., allocations, de-allocations and replication) is provided without the use of free slab maps by including additional metadata in each block header and memory slab.

For example, as with the each of the preceding implementations, the RDMA-based memory allocator component makes use of block header metadata in each memory region. As discussed above, the block header metadata in the preceding implementations comprises information including, but not limited to, an indication of whether each block in a particular memory region is free or allocated, slab sizes for each allocated block, a count of the number of allocated slabs in each allocated block of the memory region, and a slab reservation bitmap. However, in implementations where the free slab map is eliminated, the metadata of each of the block headers in a memory region further includes an additional reference to a first free slab of that block.

In addition, each slab, including the first free slab in each block, includes its own metadata header with a reference that is pointing to the next free slab in the block, and so on (e.g., a linked list) until the last free slab in the block is reached. This last free slab in the block either has no reference to any other free slab, or simply a null reference. Further, as discussed above, whenever a block is first allocated, it is divided into a set of equal sized memory slabs. Consequently, in implementations where the free slab map is not used, the metadata in each slab header is initialized during the initial block allocation process so that each slab in the block (which are initially all free) includes an initial reference to some other free slab in that block.

In various implementations, the initial references from one free slab to the next are sequential (e.g., slab-1 has a reference to slab-2, which references slab-3, and so on). However, any order of free slab references to other free slabs may be applied, including random orders, so long as all of the slabs in the block are referenced by one other slab in the block, and no slab is referenced by more than one other slab. Then, during the allocation process, the metadata in the block header indicating the next free slab will change with each allocation. Similarly, during the de-allocation process, both the metadata in the block header and the metadata in the header of the slab being freed will change with each de-allocation.

The following discussion summarizes an exemplary block allocation process by the RDMA-based memory allocator component for implementations in which the free slab map is eliminated. Further, this process may be modified using the techniques described herein that apply RDMA-based RPC messages. The following sequence of events is not intended to describe or include all of the various implementations of the Distributed Storage Controller, and is provided only for purposes of example. For example, in the case of RDMA-based block allocations for newly allocated blocks, the RDMA-based memory allocator component can perform allocations via the following sequence, which assumes initial sequential slab references for purposes of explanation. This block allocation process does not need to be repeated unless an entire block is de-allocated and then subsequently re-allocated.

1. Determine the memory region from which to allocate a selected free block and the desired slab size for that block;
2. Divide the block into the appropriately sized slabs;
3. Initialize the references in each slab header to point to the next sequential slab in the block. More specifically, slab-n includes an initial reference pointing to slab-(n+1) as the next free slab, and so on, with the last free slab in the block including a null reference that may change to point to some other free slab in response to subsequent slab allocations and de-allocations. For example, the slab header of the first slab (e.g., slab-1) is initialized as pointing to slab-2 as its next free slab, while the slab header of slab-2 is initialized as pointing to slab-3 as its next free slab, and so on; and
4. Initialize the block header of the block being allocated to include a reference to the first free slab (e.g., slab-1).

The following discussion summarizes an exemplary slab allocation process by the RDMA-based memory allocator component for implementations in which the free slab map is eliminated. Further, this process may be modified using the techniques described herein that apply RDMA-based RPC messages. The following sequence of events is not intended to describe or include all of the various implementations of the Distributed Storage Controller, and is provided only for purposes of example. For example, in the case of RDMA-based slab allocations, the RDMA-based memory allocator component can perform slab allocations via the following sequence:

1. Determine a particular memory region and slab allocation size from which to allocate a slab of memory;
2. Perform an RDMA read of the block headers in the memory region;
3. Evaluate the block headers of the memory region to obtain the reference to the first free slab (e.g., slab-a) of a particular block (e.g., a block with slabs of an appropriate size);
4. Perform an RDMA read of the metadata header of slab-a (i.e., the first free slab referenced in the block header);
5. Evaluate the metadata of slab-a to obtain the reference to the next free slab, e.g., slab-b;
6. Perform and RDMA CAS operation (based on the known reference to slab-a) on the block header to update the metadata of the block header to reference the first free slab as being slab-b. The CAS operation may fail for some reason, e.g., some other slab allocation or de-allocation occurred subsequent to step 2, above. As such, upon failure of the CAS operation, the slab allocation process can restart from either step 1 or step 2, above, and then repeat through step 6 until the CAS operation is successful; and
7. Return to a reference to slab-a to the thread, process, or application requesting the slab allocation.

The following discussion summarizes an exemplary slab de-allocation process by the RDMA-based memory allocator component of the Distributed Storage Controller for implementations in which the free slab map is eliminated. Further, this process may be modified using the techniques described herein that apply RDMA-based RPC messages. The following sequence of events is not intended to describe or include all of the various implementations of the Distributed Storage Controller, and is provided only for purposes of example. For example, in the case of RDMA-based slab de-allocations, the RDMA-based memory allocator component can perform slab de-allocations via the following sequence:

1. Perform an RDMA read of the block header in which a particular slab, e.g., slab-j, is to be de-allocated;
2. Evaluate the metadata in the block header to obtain the reference to the first free slab in the block, e.g., slab-k;
3. Perform an RDMA write operation to update the metadata in the header of the slab being de-allocated (i.e., slab-j) to reference slab-k as the next free slab in the block;
4. Perform an RDMA CAS operation (based on the known reference to slab-k) on the block header to update the metadata of that block header to reference the first free slab as being slab-j. The CAS operation may fail for some reason, e.g., some other slab allocation or de-allocation occurred subsequent to step 1, above. As such, upon failure of the CAS operation, the slab de-allocation process can restart from step 1, and then repeat through step 4 until the CAS operation is successful.

2.7 RDMA-Based Reads of Shared Memory:

Advantageously, RDMA-based reads of the shared memory are self-directed, with the client node managing its own reads of shared memory on any storage node, regardless of where that memory is being hosted within the RDMA-based network. Further, as mentioned previously, RDMA-based reads of the shared memory by any client node are performed concurrently with self-directed RDMA-based reads, writes, and CAS operations on shared memory throughout the network by other client nodes, controller nodes, and storage nodes, thereby enabling the shared memory if the Distributed Storage Controller to scale to very large numbers of concurrent accesses while maintaining very low latencies for reads and writes to the shared memory.

In various implementations, the read process begins operation by determining the address of the memory slab where the read is to be performed. This address may be obtained from some process or application that provides the address within a particular memory slab where one or more memory elements (e.g., bits, bytes, or other subsections of the memory slab) are to be read, or by querying the controller node for addresses of particular memory elements or memory structures to obtain the appropriate address. Regardless of how the address is obtained, given a particular memory address to be read (e.g., one or more memory elements of a particular memory slab), reads on the shared memory are performed by the client using RDMA operations to perform one-way reads on the corresponding memory slab. Further, the lock-free nature of the Distributed Storage Controller enables multiple client nodes to read the same memory slab concurrently while any number of client nodes are concurrently performing writes to any other slabs of shared memory on the same or other storage nodes.

In particular, given the address of a particular memory slab, the client performs an RDMA read of the entire memory slab. Alternately, the client can perform an RDMA read of only the portion of the slab that contains the data it is interested in. However, reading the entire slab as a single read doesn't take any additional read operations relative to reading a portion of the slab because, in various implementations, slab size is set equal to or less than maximum RDMA read and write sizes. Further, as mentioned above, in various implementations, each memory slab includes an optional metadata section that includes a checksum value jointly computed from each memory element of the slab.

In various implementations, whenever any memory slab is read, the client node computes a checksum value from the memory elements of the slab and compares the computed checksum to a checksum in the metadata portion of that slab. The client then repeats the RDMA read of that memory slab, if necessary, until such time as the computed checksum matches the checksum in the slab metadata. Once the checksum match is confirmed for the memory slab, the Distributed Storage Controller returns the data in any particular memory elements of the slab being sought by the client.

In cases where there is a large volume of writes to a particular memory slab, or simply overlapping timing of reads and writes to that memory slab, the checksum of the slab may not match the checksum computed by the client until any particular write to that slab has been completed (see discussion of RDMA-based writes in Section 2.8). Consequently, in various implementations, system overhead is reduced by checking the reservation bit of the memory slab via an RDMA read prior to performing slab reads and the subsequent computation and comparisons of checksums. In such implementations, the RDMA reads of the reservation bitmap are repeated until the particular reservation bit of the memory slab shows that slab as being free, at which time the slab is read via an RDMA read.

Figure 7:
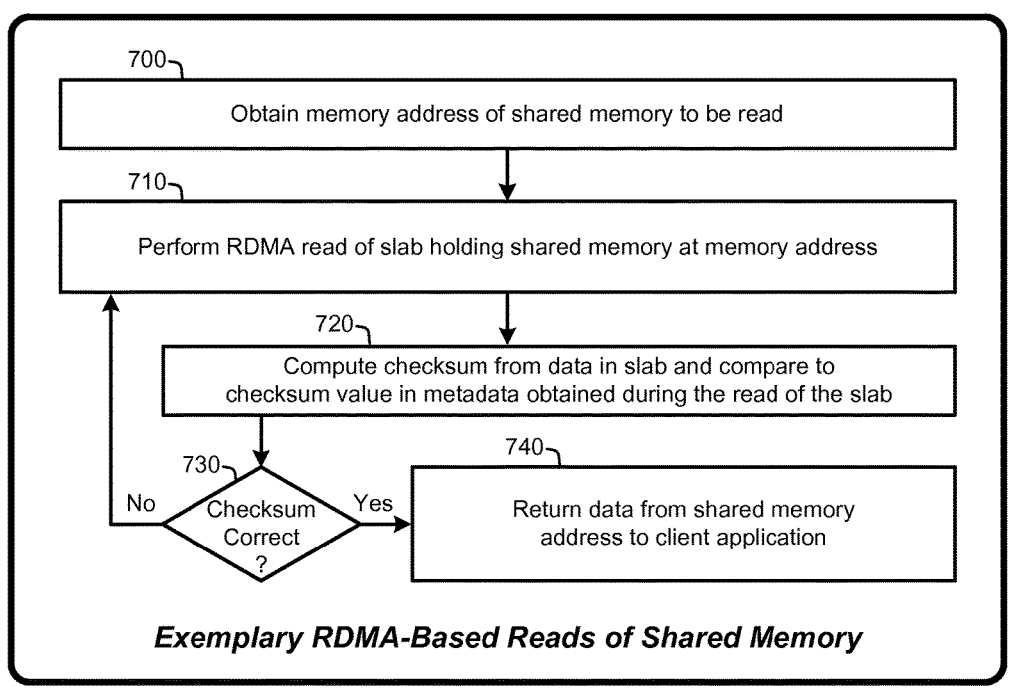
FIG. 7 provides a general flow diagram that illustrates various exemplary techniques for effecting RDMA-based reads of shared memory.

The system diagram of FIG. 7 illustrates various implementations for performing RDMA-based reads of the shared memory provided by the Distributed Storage Controller. Furthermore, while the system diagram of FIG. 7 illustrates a high-level view of various implementations of the Distributed Storage Controller, FIG. 7 is not intended to provide an exhaustive or complete illustration of every possible implementation of the Distributed Storage Controller as described throughout this document.

For example, as illustrated by FIG. 7, in various implementations, the read process begins operation by obtaining (700) the address of the shared memory to be read, either by querying a known source (e.g., the aforementioned placement library or any other source), in response to a publication of the address that is automatically pushed to the client node, or receipt of that address from any executing applications, processes, subroutines, etc. Next, the client performs an RDMA read (710) of the memory slab holding the shared memory at the memory address being sought by the client. The read process can be considered complete at this point. However, data validity can be verified via the aforementioned computation and comparison of checksums.

For example, in various implementations, whenever a memory slab is read, the client node computes (720) a checksum from the entries in the memory slab and compares (730) that computed checksum to the checksum value in the metadata portion of the memory slab obtained during the read of that memory slab. The client then repeats the RDMA read (710) of that memory slab, if necessary, until such time as the computed checksum matches the checksum in the slab metadata. Once the checksum match is confirmed for the memory slab, the Distributed Storage Controller returns (740) the data from the corresponding shared memory to the client or to the client application, process, subroutine, etc., that originally requested the read.

Further, in various implementations, if the computed checksum does not match the checksum in the metadata after some predetermined number of read attempts, this may indicate that there are one or more bad or corrupt entries in the memory slab, or simply that a memory error may have occurred for some reason. In this case, the Distributed Storage Controller then either restores the memory slab from a valid replica (e.g., reserve the memory slab on the primary, read the corresponding memory slab from the valid replica and then write that data to the corresponding memory slab of the primary followed by a release of the corresponding reservation bit) or marks that memory slab as bad in the aforementioned placement library and then moves to the replica, now the primary, to perform the read process. Further, whenever any data is written to any memory slab, that data is eventually replicated to each replica so insure consistency between the primary and each replica.

2.8 RDMA-Based Writes to Shared Memory:

Whenever any client wants to write to a particular memory slab (or one or more memory elements within that slab), the client first reserves that memory slab via the aforementioned reservation bitmap. Once a slab has been successfully reserved, only the reserving client can write to that slab until the reservation is released. As such, this reservation ensures that there will not be any write collisions where two or more clients are attempting concurrent writes to the same memory slab. In general the reservation is for the entire slab that is being written. However, as discussed in further detail below, larger reservations for entire memory blocks or memory regions and smaller reservations for individual memory elements within an individual memory slab are also enabled by various implementations of the Distributed Storage Controller. Writes by other clients are then only prevented for the memory that is actually reserved, whatever the size of that reserved memory, until such time as that reservation is released.

More specifically, in various implementations, the write process begins operation by determining the address of the memory slab where the write is to be performed. This address may be obtained from some process or application that provides the address of one or more memory elements within a particular slab where data is to be written, or by performing RDMA-based reads of the controller node for addresses of particular memory elements or memory structures to obtain the appropriate address. Regardless of how the address is obtained, the RDMA-based writes to the address is protected via a reservation during the write process to ensure consistency of the shared memory. For example, given the memory address to be written, the Distributed Storage Controller performs an RDMA CAS operation on the aforementioned reservation bitmap to flip the bit associated with the corresponding memory slab to indicate that the slab is reserved for writing (e.g., "0" if free, or "1" if reserved). If the CAS operation is not successful, this means that the memory slab is already reserved for writing by some other client node. In this case, the client node simply repeats the RDMA CAS operation until such time that the CAS operation is successful, thereby reserving that memory slab for writing by that client.

Once the slab has been reserved, the client node can simply perform an RDMA write to that slab, or one or more memory elements of that slab followed by a release of the reservation. However, in order to ensure consistency of the data, in various implementations, following successful reservation of the memory slab, the client first performs an RDMA read of that slab prior to the write operation to obtain the current data of the various memory elements of that memory slab and, optionally, the corresponding checksum in the slab metadata. Given one or more new data elements to be written to the memory slab, the Distributed Storage Controller then computes a new checksum from the combination of all of the existing data elements in the memory slab that are not being changed via the write operation and all of the new data elements that are being written to the memory slab.

As mentioned above, the entire slab may be written as a single RDMA-based write operation. Therefore, when updating the checksum during write operations, a single RDMA write is performed to write the entire memory slab with all of the existing data elements in that slab (read via the prior RDMA read) that are not being changed and all of the new data elements that are being changed along with the newly computed checksum. Once this write is complete, the Distributed Storage Controller releases the reservation of the memory slab by performing either an RDMA CAS operation or an RDMA write on the reservation bit associated with that slab to flip the bit back to indicate that the slab is no longer reserved.

In various implementations, whenever a memory slab write is to be performed, the Distributed Storage Controller adds an optional error checking step to confirm slab integrity prior to writing that slab. For example, following the initial RDMA read of the memory slab, the Distributed Storage Controller computes a checksum from the existing data elements in that slab. So long as the computed checksum matches the original checksum in the metadata, then the Distributed Storage Controller continues with the write operation, including the new checksum, as discussed above. However, if the computed checksum does not match the checksum in the metadata, this indicates that there are one or more bad or corrupt entries in the slab, or simply that a memory error may have occurred for some reason. In this case, the Distributed Storage Controller either restores the memory slab from a valid replica and restarts the write process or marks that memory slab as bad in the aforementioned placement library of the controller node and then moves to the replica, now the primary with respect to that memory slab, and restarts the write process.

Figure 8:
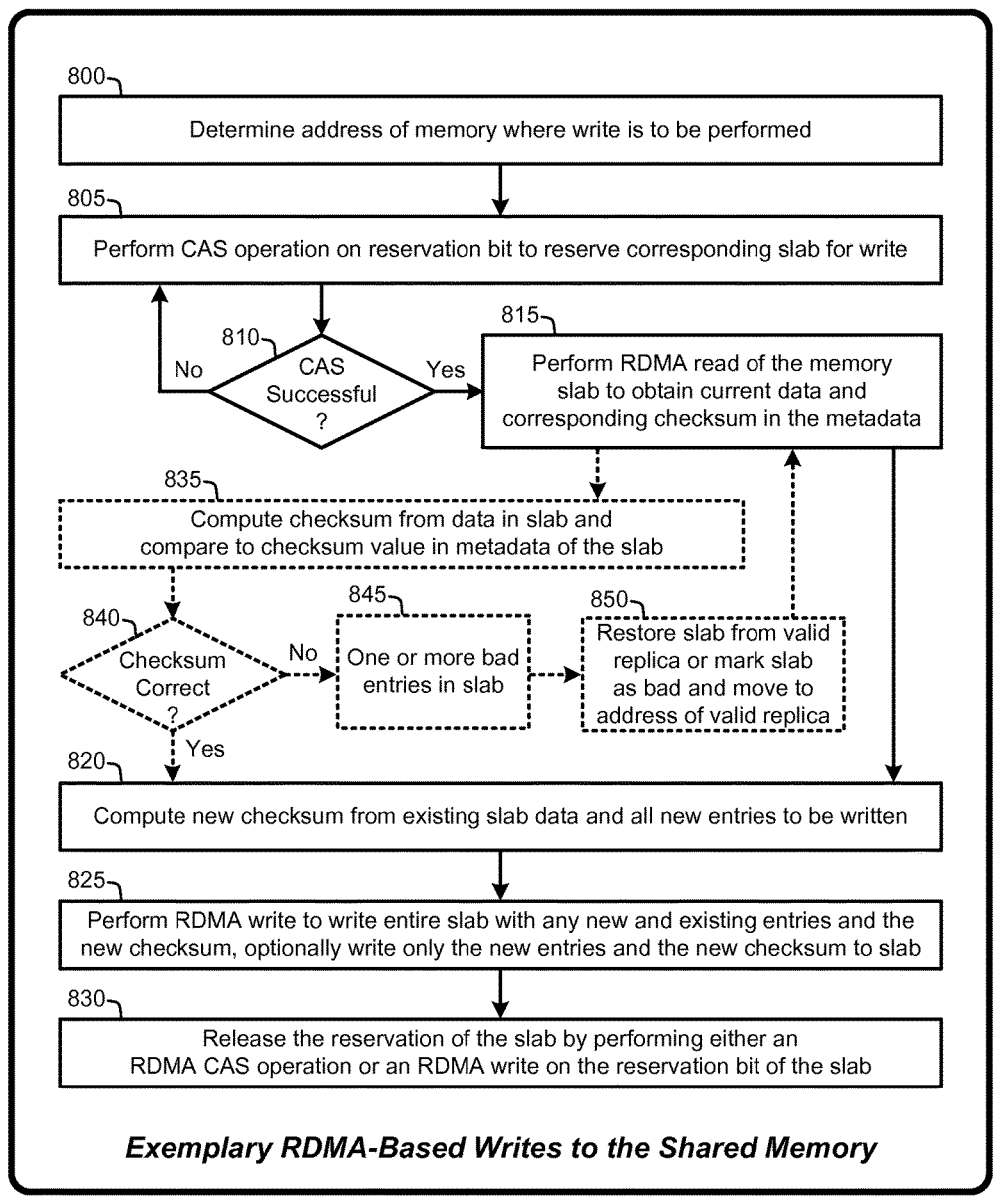
FIG. 8 provides a general flow diagram that illustrates various exemplary techniques for effecting RDMA-based writes to shared memory.

The system diagram of FIG. 8 illustrates various implementations for performing RDMA-based writes to the shared memory. Furthermore, while the system diagram of FIG. 8 illustrates a high-level view of various implementations of the Distributed Storage Controller, FIG. 8 is not intended to provide an exhaustive or complete illustration of every possible implementation of the Distributed Storage Controller as described throughout this document. In addition, any boxes and interconnections between boxes that may be represented by broken or dashed lines in FIG. 8 represent alternate implementations of the Distributed Storage Controller described herein. Further, any or all of these alternate implementations, as described herein, may be used in combination with other alternate implementations that are described throughout this document.

In general, as illustrated by FIG. 8, in various implementations, the write process begins by determining (800) the address of the memory slab where the write is to be performed. This address where the write it to be performed may be obtained either by querying a known source (e.g., the aforementioned placement library or any other source), in response to a publication of the address that is automatically pushed to the client node, or receipt of that address from any executing applications, processes, subroutines, etc.

Once the address of the memory slab to be written is determined, the Distributed Storage Controller then performs an RDMA CAS operation (805) on the aforementioned slab reservation bitmap to flip the bit associated with that particular memory slab to indicate that the slab is reserved for writing. If the CAS operation is not successful (810), this means that the memory slab is already reserved for writing by some other client node. In this case, the requesting client node simply repeats the RDMA CAS operation (805) until such time that the CAS operation is successful, thereby reserving the memory slab for writing by that client.

Following successful reservation of the memory slab, the client performs an RDMA read (815) of the memory slab to obtain the current key-value/pointer pairs of the memory slab and the corresponding checksum in the slab metadata. Given one or more new entries or data elements to be written to the memory slab, the Distributed Storage Controller then computes (820) a new checksum from the combination of all of the existing entries or data values in the memory slab that are not being changed and all of the new entries or data values that are being written. A single RDMA write (825) is then performed to write the entire memory slab with all of the existing entries or data values in the memory slab that are not being changed and all of the entries or data values along with the new checksum. Once this write is complete, the Distributed Storage Controller releases (830) the reservation of the memory slab by performing either an RDMA CAS operation or an RDMA write on the reservation bit associated with that memory slab to flip the bit back to indicate that the memory slab is no longer reserved.

In various implementations, whenever a memory slab write is to be performed, the Distributed Storage Controller adds an optional error checking step to confirm validity of the data in the memory slab prior to writing that memory slab. In particular, as illustrated by FIG. 8, following the initial RDMA read (815) of the memory slab, the Distributed Storage Controller computes (835) a checksum from the existing entries or data values in the memory slab. So long as the computed checksum matches (840) the checksum in the metadata, then the Distributed Storage Controller continues with step (820), as discussed above. However, if the computed checksum does not match the checksum in the metadata, this indicates (845) that there are one or more bad or corrupt entries in the memory slab, or simply that a memory error may have occurred for some reason. In this case, the Distributed Storage Controller then either restores (850) the memory slab from a valid replica and restarts the write process from step (815) or marks that memory slab as bad in the aforementioned placement library and then moves to the replica, now the primary, and restarts the write process from step (815).

2.8.1 Reservation Considerations:

In general, the Distributed Storage Controller reserves the entire memory slab being written. However, in various implementations, depending on the particular use and traffic profile for shared memory application, the Distributed Storage Controller can be configured to reserve a section of memory consisting of multiple memory slabs (or entire memory blocks or regions). However, read and write efficiency is generally improved by reserving only the memory slab being written. Further, in various implementations, the Distributed Storage Controller can be configured to reserve individual elements or entries of the memory slab being written so that multiple users can perform concurrent writes to the same memory slab. In this case, rather than providing a checksum over the entire memory slab, individual checksums would be used for each individual element of the memory slab. In other words, the checksum is on the maximum reservation size. So, in order to reserve smaller elements than an entire memory slab, there will be more checksums. This configuration may provide performance improvements depending on the particular workload and traffic patterns of the shared memory application being enabled by the Distributed Storage Controller.

In other words, depending on the workload and network traffic, the Distributed Storage Controller can be configured to reserve: 1) an entire memory region; 2) one or one or more blocks of a particular memory region; 3) an entire memory slab; or 4) one or more individual memory elements a single memory slab. In each case, the checksum corresponds to the particular level of reservation. However, given the relatively small size of the individual memory slabs, RDMA-based writes to the individual elements of memory slabs don't take much less time, if any, than to write the entire memory slab. So, in terms of latency, there isn't typically much of a benefit to reserving individual slab elements over reserving the entire memory slab. However, whether or not a latency benefit is observed will depend on the particular workload (e.g., how many concurrent writes to a particular memory slab are being performed). For example, if there is approximately evenly distributed high contention across the individual elements of the memory slab, providing reservations for those individual elements would typically reduce overall system latency relative to reservation of the entire memory slab.

2.8.2 Addressing Potential Write Failure Cases:

As with any computing system, various failures may occur during write operations by any client node to any slab of the shared memory. For example, following reservation of a particular memory slab and prior to performing a successful write, the client performing the write may go offline for some reason and thus be unable to remove the reservation bit or flag for that slab. Similarly, following reservation of a particular memory slab and successful write to that slab, the client performing the write may go offline for some reason and thus be unable to remove the reservation bit or flag for that slab. Advantageously, in either case, the checksum of that memory slab will be correct if either the write has not been performed at all or if the write has been completed without clearing the reservation bit. As such, whether or not the write is performed following the reservation, the checksum will indicate whether the data in the slab is valid. Partial writes to a slab do not occur in response to RDMA-based write operations.

Consequently, to address the issue of a memory slab reservation that is not released for any reason, in various implementations, the Distributed Storage Controller assumes that the shared memory is operating properly but also puts a maximum bound (e.g., time t) on the length of time that any particular memory slab can be reserved. For example, consider the scenario of server A wanting to write to memory slab n (hosted on server B) which is reserved via the reservation bitmap, while server C that originally reserved memory slab n goes offline for some reason either before or after writing to memory slab n, but prior to releasing the reservation. In this scenario, server A will wait a predetermined amount of time t for the reservation to be released. If the reservation is then not released following expiration of that time period, server A sends an RPC message to server B to inform server B that the memory it is hosting for memory slab n has been reserved for too long, and asking for that reservation to be released. Assuming that the reservation bitmap for memory slab n is locally hosted by server B, server B can then flip the reservation bit, via an internal DMA CAS operation, to release the reservation for memory slab n. Alternatively the Distributed Storage Controller can acquire all reservations via sending an RPC message to the server hosting the memory in question and then the host machine can release the reservations following the timeout period.

Further, in the case that some sort of memory corruption has occurred in a memory slab for any reason, the metadata checksum will no longer match the computed checksum, thereby indicating incorrect, erroneous, or otherwise corrupted data in that slab. In this case, as mentioned above, the Distributed Storage Controller can either restore the corrupted memory slab from a valid replica of that slab, or mark that slab as bad and then move to a valid replica for future reads and writes.

2.9 RDMA-Based RPC Messages:

As mentioned above, in various implementations, the Distributed Storage Controller combines RDMA messaging and remote procedure call (RPC) requests to provide reads and writes to the shared memory and fast lock-free memory allocations and de-allocations for shared memory distributed across multiple servers in the RDMA-based network. In such cases, the CPUs of the client and host servers only become involved when they execute a read, write, or memory allocation or de-allocation request specified by an RPC request transmitted between the client and the host servers via RDMA-based messaging.

For example, in various implementations, an application, process, or thread executing on any particular networked server makes a memory access request (e.g., read, write, allocation or de-allocation request) that is intercepted by the local instance of the Distributed Storage Controller executing on that server. The Distributed Storage Controller instance of that server then applies an RDMA write to enter the appropriate RPC read, write, allocation or de-allocation request to a memory buffer of another one of the servers acting as a storage node (which could be the same or a different one of the servers). One or more local threads on the receiving server then monitor that buffer for receipt of an RPC memory access request.

In response to receipt of that RPC-based memory access request, the CPU of the receiving server (instead of the NIC in the case of RDMA-based requests) executes the same sequences of DMA reads, writes, and CAS operations on the reserved memory to perform local reads, writes, allocations and/or de-allocations on the shared memory. For example, in response to memory slab reads, the receiving server then sends the contents of the memory slab to the requesting server by applying an RDMA write of the contents of that memory slab to a memory buffer of the requesting server. One or more local threads on the requesting server monitor the buffer of that server for receipt of the memory slab contents.

Similarly, in response to memory allocation requests, the receiving server executes the same sequence of reads and CAS operations on the block header and free slab maps described above to perform the requested lock-free allocation or de-allocation. The receiving server then sends a reference to the allocated memory to the requesting server by applying an RDMA write of that reference to a memory buffer of the requesting server. One or more local threads on the requesting server monitor the buffer of that server for receipt of the reference to the allocated memory (or confirmation of a successful de-allocation request).

The overhead and latency of sending an RPC message via RDMA is higher than the techniques described herein that rely solely on RDMA messaging. However, one of the advantages of this process is that reads, writes, and CAS operations performed by the CPU in response to receipt of an RPC message are typically much faster than reads, writes, and CAS operations performed by the NIC in response to receipt of RDMA messages.

Figure 9:
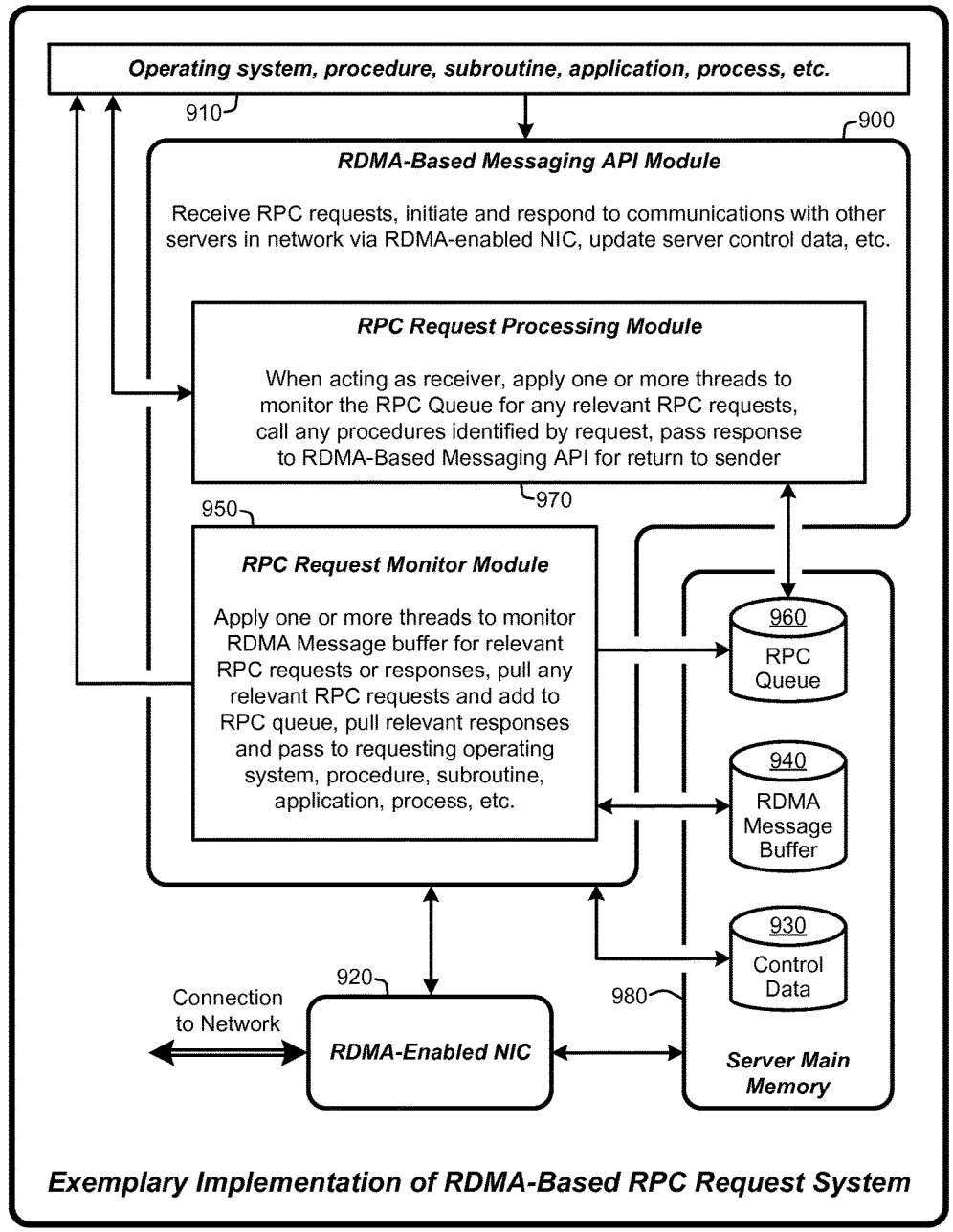
FIG. 9 illustrates an exemplary process for implementing the RDMA-based RPC messaging.

As mentioned above, the Distributed Storage Controller provides various techniques for enabling fast RPC requests via a sequence of RDMA messages transmitted using commodity NICs between networked computers in a data center or other network environment to provide an overall system that is both lock-free and thread-safe. The processes summarized above are illustrated by the general system diagram of FIG. 9. In particular, the system diagram of FIG. 9 illustrates the interrelationships between program modules for implementing various implementations of the Distributed Storage Controller, as described herein. Furthermore, while the system diagram of FIG. 9 illustrates a high-level view of various implementations of the Distributed Storage Controller, FIG. 9 is not intended to provide an exhaustive or complete illustration of every possible implementation of the Distributed Storage Controller as described throughout this document.

In addition, any boxes and interconnections between boxes that may be represented by broken or dashed lines in FIG. 9 represent alternate implementations of the Distributed Storage Controller described herein. Further, any or all of these alternate implementations, as described below, may be used in combination with other alternate implementations that are described throughout this document.

In general, as illustrated by FIG. 9, the processes enabled by the RDMA-Based RPC Request System begin operation by applying an RDMA-Based Messaging API Module 900 to perform various functions, including, but not limited to receiving RPC requests from an operating system, procedure, subroutine, application, process, etc. (910), initiating and responding to communications with other servers in network via an RDMA-enabled NIC 920, updating server control data 930, etc.

In addition, an RPC Request Monitor Module 950 of the RDMA-Based Messaging API Module 900 applies one or more threads to monitor an RDMA Message Buffer 940 for relevant RPC requests or responses. The threads of the RPC Request Monitor Module 950 pull relevant RPC requests from the RDMA Message Buffer 940 and adds those requests to an RPC Queue 960. In addition, the threads of the RPC Request Monitor Module 950 pull relevant responses from the RDMA Message Buffer 940 and pass those responses to the requesting operating system, procedure, subroutine, application, process, etc. (910) that initiated the RPC request on that server.

In various implementations, one or more blocks of server main memory 980 are allocated to host the control data 930, the RDMA Message Buffer 940, and the RPC queue 960, such that the allocated memory is only accessed by the RDMA-Based Messaging API Module 900 and via DMA read/write calls to that memory by the NIC. In other words, no other processes executing on the host server other than the RDMA-Based Messaging API Module 900 or the NIC of the host server writes to allocated server main memory 980.

Further, an RPC Request Processing Module 970 is applied in the case that a particular server applies one or more threads to monitor the RPC Queue 960 for relevant RPC requests (transmitted via RDMA write messages). When any of these threads identifies a relevant RPC request, that thread calls the procedure identified by the RPC request and, when that procedure has completed execution, the RPC Request Processing Module 970 passes the response to that RPC request to the RDMA-Based Messaging API 900 for return to the sender server via the RDMA-Enabled NIC 920.

2.10 Replicating Allocated Memory Across Multiple Servers:

In various implementations, the Distributed Storage Controller optionally replicates allocated memory slabs, blocks, or entire memory regions, across one or more additional servers to provide data redundancy in the event of data corruption on a particular server or loss of a particular server for any reason. Writes to any allocated memory on a primary server are then automatically replicated to the corresponding allocated memory slabs, blocks, or entire memory regions on one or more replica servers. Further, in various implementations, memory slabs or blocks, or entire memory regions that have been replicated to one or more additional servers are automatically de-allocated whenever a call for de-allocation of the original slab, block, or entire memory region is received by the Distributed Storage Controller.

For example, when replicating a state of allocated memory, that memory is first allocated (or de-allocated) to a primary location using the RDMA-based techniques described herein. Once the memory has been allocated (or de-allocated) on the primary, the Distributed Storage Controller optionally copies each corresponding memory region to one or more replicas (on the same or different servers). As such, if there are no ongoing allocations or de-allocation each of the replicas will be identical to the primary.

In general, in various implementations, the optional replication processes performed by the Distributed Storage Controller are implemented as a simplified version of the allocation and de-allocation processes performed by the RDMA-based memory allocator component of the Distributed Storage Controller, as described above. However, any known technique for replicating memory may be applied following the original allocation.

More specifically, in the case of allocations, once a particular block and slab have been allocated to the primary, the RDMA-based memory allocator component of the Distributed Storage Controller knows exactly which block and slab have been allocated in particular memory regions. Therefore, after that allocation has been completed, the RDMA-based memory allocator component applies the RDMA-based techniques described above to create each replica by performing the steps described below (which should be understood in view of the preceding detailed description regarding RDMA-based memory allocations). However, as noted above, after any memory has been allocated, any known technique for replicating memory may be applied to create replicas. Assuming the use of the RDMA-based techniques described herein, replication is accomplished (for each replica of the primary) via the following steps:

1. Apply an RDMA CAS operation to update the number of free slabs in the appropriate block header of the replica memory region;
2. Apply an RDMA CAS operation to mark the appropriate slab as being used in the free slab map of the replica; and
3. Propagate any writes to allocated slabs on the primary to each of the replicas.

In the case of de-allocations, in various implementations, the replication process performed by the RDMA-based memory allocator component of the Distributed Storage Controller considers whether additional slabs are being used in a memory block of the primary following de-allocation of a particular slab.

For example, in the case where other slabs are still being used in a block following de-allocation of a particular slab, the replica is updated by using the above described RDMA-based techniques for changing the metadata to decrease number of slabs used in the block header of the replica and to mark the slab as free in the free slab map of the replica. These processes are duplicated for each replica of the primary.

Conversely, in the case where the slab being freed on the primary is the last (or only) slab being in the block, in various implementations, the RDMA-based memory allocator component of the Distributed Storage Controller performs the following steps:

1. Apply an RDMA CAS operation to mark the block of the primary as reserved rather than free;
2. Evaluate the first replica to ensure that the copy of the slab de-allocated on the primary is the only slab being used in the corresponding block, and when true, apply an RDMA CAS operation to mark the block of that replica as free;
3. Repeat step 2 for all replicas of the primary to complete the de-allocation process for each replica; and
4. After completing the de-allocation process on all replicas, apply an RDMA CAS operation to mark the block of the primary as free.

2.10.1 Additional Replication Considerations:

For safety and redundancy, in various implementations, the primary and each of its replicas (e.g., control nodes, storage nodes and/or client nodes) are put into different "failure domains." For example, in various implementations, each primary and any replicas will run on different power sources, each may be in physically separate racks, rooms, or even buildings, etc. Consequently, any single type of failure (e.g., power failure, building or computer damage from earthquake, fire, flood, intentional acts, etc.) will not disable any particular primary and all of its replicas. Consequently, by putting the primary and each replica of any node (e.g., control nodes, storage nodes and/or client nodes) into a different failure domain, data held by the shared memory of the Distributed Storage Controller is never lost due to any single point failure.

In general, whenever any primary goes offline or becomes unavailable or unresponsive for any reason, the Distributed Storage Controller (via one of the controller nodes which maintains a current operational status of each node) immediately designates an existing replica of that primary as the new primary. In addition, whenever any primary or replica goes offline or becomes unavailable or unresponsive for any reason, the Distributed Storage Controller, optionally allocates memory for a new replacement replica to ensure continued data redundancy. The allocated memory of the newly designated replica is then populated by reading data from the primary and one or more replicas and writing that data to the newly designated replica. Distribution tables for the primary and each of its replicas, including the newly designated replica are then updated to reflect any changes resulting from the change in primary and replica machine addresses.

In various implementations, whenever any client node performs a write, the write is sent concurrently to the primary and all of the replicas. For example, in various implementations, rather than send a single RDMA write to the primary storage node, in various implementations, the client node concurrently sends separate RDMA writes to the primary storage node and all of the corresponding replicas of that storage node. For example, given a primary and two replicas, the client node sends three RDMA write messages (one to each of the primary storage node and each of the two replica storage nodes). In various implementations, this write process is simplified by causing any reservation (for writes) of the memory on the primary to concurrently reserve the corresponding memory on all of the replicas of that primary. This ensures consistency between the primary and all of its corresponding replicas.

In contrast to writes to the shared memory, when performing RDMA-based reads, the consistency between the primary and each of its replicas enables the client node to perform the read on either the primary storage node or on any of the replicas of that storage node. Therefore, network traffic to particular primary machines is reduced by the Distributed Storage Controller by causing client nodes to select which of the primary or one its replicas is to be addressed to perform a read either on random basis or based on known network traffic to those machines (e.g., direct the read to the machine with the lowest traffic). In either case, overall system latency tends to be reduced since not all machines are always trying to read from the primary.

In addition to replication of various servers (e.g., control nodes, storage nodes and/or client nodes) within a single data center, server farm etc., in various implementations, the Distributed Storage Controller links multiple data centers in different physical locations (e.g., geo-replication). In other words, to provide an additional level of redundancy, in various implementations, the Distributed Storage Controller replicates entire data centers, or any desired portions of those data centers. Typically, Ethernet or other transmission means are applied to transmit data to remote data centers for replication and backup purposes.

2.11 Exemplary Applications:

As mentioned above, in various implementations, client nodes include a co-processor module that provides a connection library (e.g., a DLL, executable code, library, etc. that is accessible via an API) that allows any desired functionality (e.g., a key-value store or other client application) to access and interact with the memory allocation and shared memory features of the Distributed Storage Controller via thread-safe and lock-free RDMA-based messaging. For example, an example of a B-Tree based key-value store application implemented via the co-processor module is described in the following paragraphs. Further, as noted above, other applications include, but are not limited to, map-reduce jobs, Spark jobs, search index serving jobs, machine-learning jobs, etc.

2.11.1 B-Tree Based Key-Value Store:

The following paragraphs describe a key-value store application that interfaces with the functionality of the Distributed Storage Controller via the aforementioned co-processor module. However, such applications can also access the functionality of the Distributed Storage Controller directly by enabling those applications to make appropriate calls to the various components of the Distributed Storage Controller (e.g., the RDMA-based memory allocator component, the RDMA-based messaging component, etc.). As such, for purposes of explanation, rather than repeatedly referring to accessing the functionality of the Distributed Storage Controller via the co-processor module, the following discussion of the key-value store will generally refer to the functionality of the Distributed Storage Controller as if that functionality were being directly accessed.

Typical key-value stores, also referred to as key-value databases, enable storage, retrieval and management of associative arrays such as a dictionary or hash. Key-value stores typically contain a collection of objects, or records, which in turn have many different fields within them, each containing data. These records are stored and retrieved using a key from the key-value store that uniquely identifies the record, and is used to locate and access specific data within the database.

In general, a B-Tree is a structure used to construct a key-value store that points a client down to a memory location of a data value by traversing from a root node of the B-Tree via a tree-based sequence of references to that data value in a leaf node of the tree. In other words, a path through multiple branches from the root node of the tree are sequentially traversed to reach a leaf node that contains a reference to the data value being sought by the client. Each leaf node of the tree is comprised of multiple entries with each entry including a key-value/pointer pair to the data being sought by the client. The root node and each branch node is comprised of multiple entries (e.g., a key range), which are key-value/pointer pairs to the next lower sub-branch which are traversed to reach leaf nodes.

Further, each node of the B-Tree (e.g., root nodes, branch nodes, and leaf nodes) correspond to individual memory slabs (as discussed in the preceding paragraphs) that are allocated from memory blocks. In other words, any particular node of the B-Tree is implemented within a single memory slab of the shared memory of the Distributed Storage Controller. As such, operations such as allocations, reservations, reads, and writes to nodes of the B-Tree are performed in the same or similar manner as allocations, reservations, reads, and writes to individual memory slabs.

More specifically, in a typical B-Tree, each node of the B-Tree contains keys and pointers to lower B-Tree nodes (e.g., key-value/pointer pairs). The keys act as separation values which divide its subtrees (e.g., further branch nodes or leaf nodes) while the corresponding pointer provides a reference to the memory of the next lower node of the B-Tree. For example, if an internal branch node has three child nodes then that internal node will include two keys: $k_1$ and $k_2$ (e.g., 5 and 10, respectively). The values in the leftmost subtree will be less than $k_1$ (e.g., values 1, 2, 3 are less than key value of 5), the values in the middle subtree will be between $k_1$ and $k_2$ (e.g., 6, 8, and 9 are between key values 5 and 10), and the values in the rightmost subtree will be greater than $k_2$ (e.g., 15 and 356 are greater than key value 10). The leaves hold either the data record being sought via the B-Tree read or, alternately, the leaves hold pointers to the memory holding the data record.

The B-Tree based key-value store application implemented using various functionality of the Distributed Storage Controller improves performance of reads and writes to the key-value store by distributing the memory hosting the key-value store across multiple networked servers. Further, the functionality of the Distributed Storage Controller enables the B-Tree based key-value store application to perform self-directed reads and writes to the key-value store. As such, scalability of the B-Tree based key-value store enabled by the Distributed Storage Controller is improved by avoiding the use of a central computer to coordinate or control those reads and writes. In addition, the Distributed Storage Controller provides a metadata based mechanism to ensure that the key-value store maintains consistency for reads and writes without the requirement to perform significant amounts of locking.

In various implementations, the B-Tree based key-value store application provides a growth-only structure for the key-value store. In other words, in the growth-only scenario, once memory is allocated for a new branch or leaf node of the B-Tree, that memory remains allocated (and available for future reads and writes), even if the data in that node of the B-Tree has been deleted. Further, in the growth-only scenario, the key-value/pointer pairs in any particular node of the B-Tree remain pointing to the same child node. In other words, in the growth-only case, nodes are added or appended to the tree but not removed from the tree. Further, when growing the tree, leaf nodes may be converted into branch nodes, with appropriate key-value/pointer pairs, to include additional lower levels of the tree.

Alternately, in various implementations, rather than provide a growth-only configuration of the key-value store, the B-Tree based key-value store application allows nodes to be pruned or deleted from the B-Tree. Further, branches may be converted to leaves based on pruning of lower levels of the tree. Similarly, leaf nodes may be converted into branches when adding new child nodes to the tree. However, in this non growth-only scenario, it is possible that any particular parent or child node may contain stale data (e.g., invalid key-value/pointer pairs) due to an intervening write operation or a prior node add or delete operation subsequent to the read of the parent node and prior to the read of the corresponding child node.

Consequently, to address such issues in the non growth-only case, in various implementations, the metadata of each node of the B-Tree further includes a reverse pointer to the parent node (i.e., the higher-level node that immediately precedes and contains a key-value/pointer pair to a particular lower-level node (i.e., the child node) in the key-value store)). These reverse pointers enable the B-Tree based key-value store application to validate that as it is traversing the tree it does not jump to an incorrect branch or leaf node due to any combination of node write and prior deletes and adds of nodes. In particular, while traversing the tree for the purpose of reading a particular key-value/pointer pair, the B-Tree based key-value store application compares the reverse pointer read from the metadata of any child node to the address of the parent node from which the child node was reached. In the event that the reverse pointer in the child node does not match the address of the parent node from which that child node was reached, it is possible that an intervening node add or delete operation and/or a node write operation on the child and/or parent nodes may have occurred subsequent to the read of the parent node and prior to the read of the child node. As such, the key-value/pointer pair originally read from the parent node may be stale.

In the event that the reverse pointer does not match the address of the parent node, the B-Tree based key-value store application repeats the read of the parent node and compares the key-value/pointer pair of that new read to the prior read. If the new and old key-value/pointer pairs of the parent node are different, this indicates that the parent has been updated via a new node write operation. In this case, the B-Tree based key-value store application continues traversing the tree using the new key-value/pointer pair of the parent obtained by the new read of the parent, while continuing to compare the reverse pointers, as described above.

However, if the new and old key-value/pointer pairs of the parent node are the same between the new read to the prior read, this indicates that the parent may hold stale data. In this case, the B-Tree based key-value store application bubbles up one level (i.e., to the immediate parent of the current parent node) and performs a new read of the immediate parent node. The B-Tree based key-value store application then compares the key-value/pointer pair of that new read of the immediate parent node to the prior read of the immediate parent node. If the new and old key-value/pointer pairs of the immediate parent node are different, this indicates that the immediate parent has been updated via a new node write operation. In this case, the B-Tree based key-value store application continues traversing the tree using the new key-value/pointer pair of the immediate parent obtained by the new read of the immediate parent while continuing to compare the reverse pointers, as described above. Otherwise, if the new and old key-value/pointer pairs of the immediate parent node are the same, the B-Tree based key-value store application iteratively bubbles up to next higher parents until a level of the tree is reached where the new and old key-value/pointer pairs of the next higher parent node is different, at which point the B-Tree based key-value store application continues traversing the tree given the new key-value/pointer pair of that next higher parent node, while continuing to compare the reverse pointers, as described above.

In various implementations, nodes of the key-value store enabled by the B-Tree based key-value store application have a fixed size that is less than or equal to the maximum RDMA read and write size enabled by the RDMA-enabled NIC hardware in the network. This enables the entire node to be read or written via a single RDMA read or write. For example, in a tested implementation, nodes were configured using fixed sized memory slabs allocated by the RDMA-based memory allocator component of the Distributed Storage Controller. Slab sizes were set anywhere between one byte and the maximum RDMA read size, with intermediate sizes of increasing powers of 2 (e.g., 2 bytes, 4 bytes, 8 bytes, 16 bytes, 32 bytes, 64 bytes, 128 bytes, 256 bytes, etc.). However, the B-Tree based key-value store application is operable with any desired memory allocation process, and the use of the RDMA-based memory allocator component of the Distributed Storage Controller is described herein only for purposes of explanation and example.

Each B-Tree has a publicized name (e.g., a "friendly name") by which the client first finds the appropriate key-value store. For example, in various implementations, the client contacts a known address (which may have multiple backups for redundancy), and provides the friendly name of a particular B-Tree to a process that returns a memory reference to the root node of the corresponding B-Tree. The client then applies an RDMA read of that memory address to obtain a list of branches of the root node. In various implementations, once a client receives the memory address for a particular B-Tree, the client maintains that address in order to perform future B-Tree reads or writes of the key-value store. In other words, any client only needs to obtain the address of the root node of a particular B-Tree one time, and can then maintain a copy of that address for further interactions with that B-Tree.

Optionally, in various implementations, the root node of each B-Tree is propagated to each client whenever any B-Tree is created on any server. This eliminates the initial RDMA read of the root node of each B-Tree by individual clients to provide a small performance improvement. However, given the very large number of interactions between clients and particular B-Trees, elimination of a single RDMA read of the root node by the client doesn't significantly reduce overall system latency.

2.11.2 Initializing the Key-Value Store:

When the B-Tree based key-value store application initially creates a particular key-value store, a friendly name is associated with that key-value store and provided to the aforementioned placement library along with the address of the root node of that particular key-value store. In particular, the root of that key-value store is stored in a secure memory location that is available in the aforementioned placement library or the like, and that is published (or provided on request) to each of the clients based on the friendly name associated with the key-value store. The friendly name (e.g., "Database 1") is simply an easy way for a client to reference a particular key-value store. Typically, but not necessarily, the friendly name is specified by the client requesting creation of the key-value store.

Further, when the B-Tree based key-value store application first creates any key-value store, the B-Tree based key-value store application applies the functionality of the Distributed Storage Controller to initially allocate memory for one root node, and additional memory for a full set of empty leaf nodes. In addition, when the key-value store is first created, the B-Tree based key-value store application populates key-value/pointer pairs in the root node to point to the allocated addresses of each of the corresponding leaf nodes.

The number of the leaf nodes for the root node (or any other branch node) is set at some specified value. Typically, the depth of the tree (i.e., number of levels) increases in inverse proportion to the number of branch and leaf nodes addressable from the root or other branch node. In other words, wide trees (more branches or leaves from each node) tend to have fewer levels than narrow trees. This root branch can be cached on any client since it is unlikely to change, especially in instances where the key-value store is set up in a growth-only configuration, as discussed in further detail in Section 2.11.4.

2.11.3 Splitting or Updating Nodes:

In general, as the key-value store grows, existing leaf nodes are converted to branch nodes to expand the B-Tree downwards with additional levels. When converting a leaf node to a branch node, new entries are first added to the reservation bitmap for each of the new leaf nodes that depend from the node being converted to a branch. In addition, the reservation bits (same as the aforementioned reservation bitmap for reservations of memory slabs) for each of the new leaf nodes and the node being converted to a branch are all flipped to reserve those nodes until node write operations on all of those nodes are completed to write the appropriate key-value/pointer pairs to those nodes. As discussed with respect to reservations of the aforementioned memory slabs, these reservations are then released after the conversion process is complete so that reads and writes of the converted node of the B-Tree and the new leaf nodes may be performed, as described herein.

Conversely, when deleting data from a particular leaf node, that leaf node may no longer hold any key-value pairs that point to any data. In this case, the leaf node may be maintained with null data that may be populated with key-value/pointers at some point via RDMA-based writes. Alternately, in some cases, the leaf node is pruned from the B-Tree by converting the parent branch node into a leaf node. As with conversion from a leaf to a branch node, whenever a node is converted from a branch to a leaf node, all of the affected nodes are reserved by flipping the corresponding bits of the reservation bitmap until the conversion process is complete via writes of new key-value/pointer pairs to the node being converted to a leaf node.

For example, when expanding the tree, the tree grows by converting one or more leaf nodes to branches and allocating memory (e.g., individual memory slabs) for new leaf nodes below the newly converted branch node. Whenever a leaf node is converted to a branch node, the B-Tree based key-value store application will perform an RDMA write, using the memory slab writing techniques described herein, to populate the converted branch with key-value/pointer pairs to reference the new leaf nodes in the newly allocated memory. In other words, the B-Tree based key-value store application applies the functionality of the Distributed Storage Controller to allocate additional memory, on one or more servers in the network, for a new full set of empty leaf nodes, and will write new key-value/pointer pairs to the newly converted branch node to point to the newly allocated addresses of each of the corresponding leaf nodes. In addition, some of the original key-value/pointer pairs in the node that was converted from a branch to a leaf node may be written to the newly allocated leaf node.

As such, these techniques enable caching of nodes of the B-Tree without needing to validate the cache. For example, in various implementations, when a branch is divided into key-value/pointer pair entries (e.g., branch contains keys 1 to 1000), that branch is never recreated. In particular, when a branch is created, the key-value/pointer pair entries are initialized as null pointers. As such, in various implementations, the B-Tree based key-value store application does not pre-allocate branches for future use, thereby saving a large amount of memory space. Then, once a null pointer needs to be converted into a real branch (with actual data) the B-Tree based key-value store application applies the functionality of the Distributed Storage Controller to perform the allocation on demand and enables writes to the newly allocated memory using the RDMA-based write techniques described herein. For example, when the key-value store is initially created, the root node is divided into some number of branches. These branches are then filled as writes are performed, and new branches (e.g., conversion of leaf nodes to branches) are allocated and filled with data on an as-needed basis.

2.11.4 Optimizations for the Growth-Only Scenario:

In various implementations, efficiency of read and write accesses to the key-value store are improved by the B-Tree based key-value store application via a growth-only scenario. In other words once memory is allocated for the key-value store that memory remains allocated, even if one or more branch or leaf nodes are logically pruned from the B-Tree. As such, from the client point of view, particular key-value/pointer pairs may be logically deleted, or entire branch or leaf nodes may be logically deleted without shrinking the tree. However, the space for that particular key or node is then available for new writes because that same allocated memory is reused whenever a new key or node is needed. Thus, once memory is allocated for the tree, it stays allocated for that tree, regardless of whether that memory holds any data.

For example, consider an example of applying the B-Tree based key-value store application to construct and provide access to a key-value store for customer purchase history. Any time that a customer makes a transaction (e.g., on a store website, in a physical store, etc.), a corresponding entry can be added to the key-value store. In the growth-only case, transactions are then never undone, even if the customer returns a purchase. The return is simply treated as an additional refund transaction. As such, optimizing the B-Tree based key-value store application using a growth-only implementation provides real-world efficiency improvements.

2.11.5 Exemplary Implementations of the Key-Value Store:

In view of the preceding paragraphs, the B-Tree based key-value store application applies the functionality of the Distributed Storage Controller to enable any client to create a key-value store and to read, write, and optionally delete records in the key value store. Reads enabled by the Distributed Storage Controller provide transactional "Get" operations that are performed via a sequence of RDMA reads and checksum comparisons of the key-value store. Writes enabled by the Distributed Storage Controller provide transactional "Put" operations that are performed via a sequence of RDMA reads, RDMA writes, and RDMA CAS operations. Similarly, optional deletes enabled by the Distributed Storage Controller provide transactional "Delete" operations that are performed via a sequence of RDMA reads, RDMA writes, and RDMA CAS operations to delete the mapping of a specified key. Because each node of the B-Tree is implemented as a single memory slab, these RDMA-based operations are performed in a manner similar to the memory operations on memory slabs, as described above.

Figure 10:
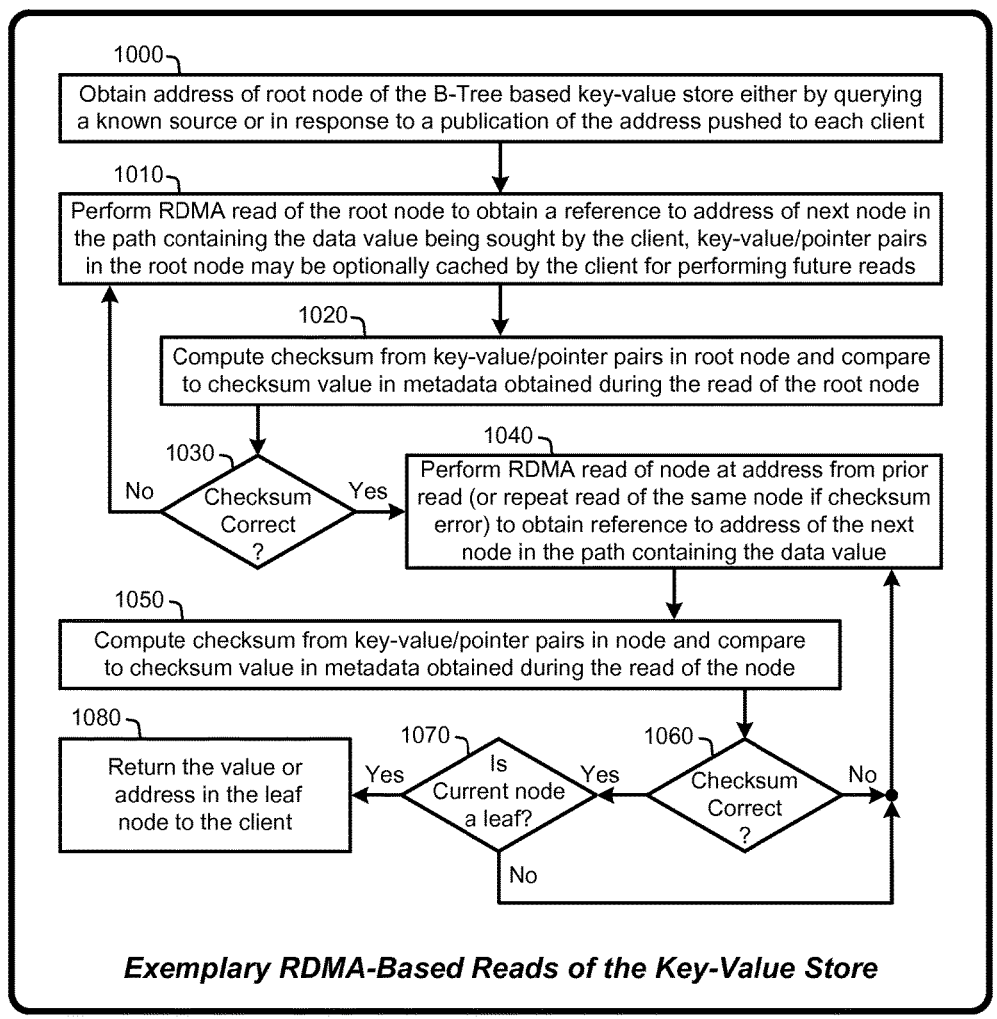
FIG. 10 provides a general flow diagram that illustrates various exemplary techniques for effecting RDMA-based reads of a key-value store implemented via a co-processor module of the Distributed Storage Controller.

The system diagram of FIG. 10 illustrates various implementations for performing RDMA-based reads of the key-value store. Furthermore, while the system diagram of FIG. 10 illustrates a high-level view of various implementations of the B-Tree based key-value store application enabled by the Distributed Storage Controller, FIG. 10 is not intended to provide an exhaustive or complete illustration of every possible implementation of either the B-Tree based key-value store application or the Distributed Storage Controller as described throughout this document. Advantageously, the RDMA-based reads of the key-value store are self-directed, with the client managing its own reads regardless of where the memory hosting the B-Tree node being read is stored within the RDMA-based network. Further, as mentioned previously, RDMA-based reads of the key-value store by any client are performed concurrently with self-directed RDMA-based reads, writes, and CAS operations on the key-value store by other clients, thereby enabling the key-value store to scale to very large numbers of concurrent client accesses while maintaining very low latencies for reads and writes to the key-value store.

For example, as illustrated by FIG. 10, in various implementations, the read process begins operation by obtaining (1000) the address of the root node of a particular instance of the B-Tree based key-value store either by querying a known source (e.g., the aforementioned placement library or any other source) or in response to a publication of the address that is automatically pushed to each client. Next, the client performs an RDMA read (1010) of the root node to obtain a reference to the address of the next node of the B-Tree in the path containing the data value being sought by the client. The client can optionally cache the key-value/pointer pairs of the root node for performing future reads of branches below the root node.

Whenever the root node is read, the client computes (1020) a checksum from the key-value/pointer pairs in the root node and compares (1030) that computed checksum to the checksum value in the metadata portion of the node obtained during the read of the root node. The client then repeats the RDMA read (1010) of the root node, if necessary, until such time as the computed checksum matches the checksum in the node metadata.

After reading the root node and verifying a checksum match, the client then performs an RDMA read (1040) of the next node in the path based on the address of that node obtained from the prior read. This read is performed to obtain a reference to the address of the next node in the path containing the data value being sought by the client. As with the read of the root node, the client again client computes (1050) a checksum from the key-value/pointer pairs in the node being read and compares (1060) that computed checksum to the checksum value in the metadata portion of that node. The client then repeats the RDMA read (1040) of the node, if necessary, until such time as the computed checksum matches the checksum in the node metadata.

Once the checksum match is confirmed for the current node, a determination (1070) is made as to whether the current node is a leaf node, thus indicating the bottom level of the tree. If the current node is a leaf node, the B-Tree based key-value store application returns (1080) the value or address being sought by the client in the leaf node to the client. Otherwise, if the node is not a leaf node, the client loops back and performs an RDMA read (1040) of the next node in the path based on the address of that node obtained from the prior read. This process continues, with node reads, checksum comparisons and determination of node level as a branch or leaf node, until the leaf node is reached and the value or address being sought is returned to the client.

However, in various implementations, if the computed checksum does not match the checksum in the metadata after some predetermined number of read attempts, this may indicate that there are one or more bad or corrupt entries in the node, or simply that a memory error may have occurred for some reason. In this case, the B-Tree based key-value store application applies the functionality of the Distributed Storage Controller to either restore the node of the B-Tree from a valid replica (e.g., reserve the node of the B-Tree on the primary, read the corresponding node of the B-Tree from the valid replica and then write that data to the corresponding node of the primary followed by a release of the corresponding reservation bit) or mark that node of the B-Tree as bad in the aforementioned placement library and then move to the replica, now the primary, to perform the read process. Further, whenever any data is written to any node, that data is eventually replicated to each replica to insure consistency between the primary and each replica.

Figure 11:
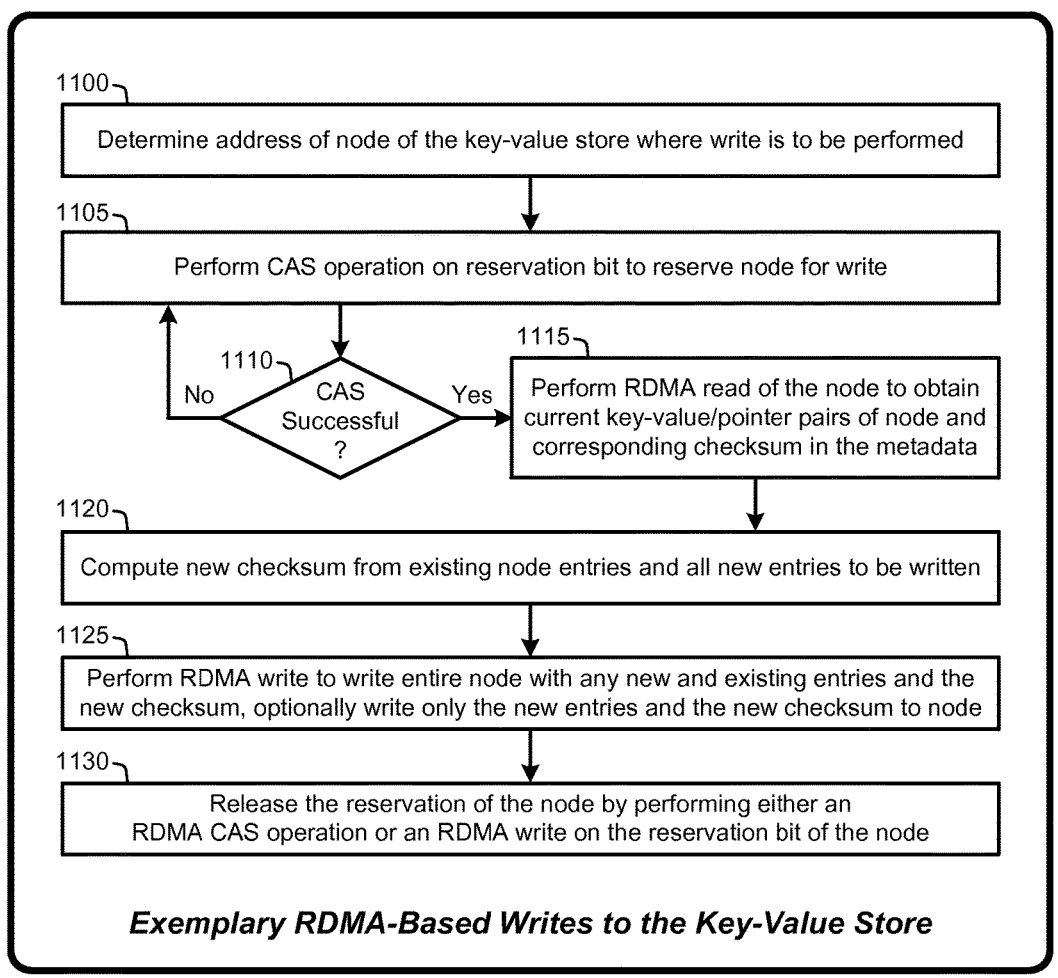
FIG. 11 provides a general flow diagram that illustrates various exemplary techniques for effecting RDMA-based writes to a key-value store implemented via a co-processor module of the Distributed Storage Controller.

The system diagram of FIG. 11 illustrates various implementations for performing RDMA-based writes to the key-value store. Furthermore, while the system diagram of FIG. 11 illustrates a high-level view of various implementations of the B-Tree based key-value store application, FIG. 11 is not intended to provide an exhaustive or complete illustration of every possible implementation of either the B-Tree based key-value store application or the Distributed Storage Controller as described throughout this document. In addition, any boxes and interconnections between boxes that may be represented by broken or dashed lines in FIG. 11 represent alternate implementations of the Distributed Storage Controller described herein. Further, any or all of these alternate implementations, as described herein, may be used in combination with other alternate implementations that are described throughout this document.

In general, as illustrated by FIG. 11, in various implementations, the write process begins by determining (1100) the address of the node of the key-value store where the write is to be performed. This address may be obtained from some process or application that provides the address within a particular node where one or more key-value/pointer pairs are to be written, or by performing RDMA-based reads of the B-Tree (e.g., by applying the process illustrated with respect to FIG. 10) to obtain the appropriate address.

Once the address of the node to be written is determined, the B-Tree based key-value store application applies the functionality of the Distributed Storage Controller to perform an RDMA CAS operation (1105) on the aforementioned node reservation bitmap (same as the reservation bitmap for individual memory slabs) to flip the bit associated with that particular node to indicate that the node is reserved for writing. If the CAS operation is not successful (1110), this means that the node is already reserved for writing by some other client. In this case, the client simply repeats the RDMA CAS operation (1105) until such time that the CAS operation is successful, thereby reserving the node for writing by the client.

Following successful reservation of the node, the client performs an RDMA read (1115) of the node to obtain the current key-value/pointer pairs of the node and the corresponding checksum in the metadata. Given one or more new key-value/pointer pair entries to be written to the node, the B-Tree based key-value store application then computes (1120) a new checksum from the combination of all of the existing key-value/pointer pairs in the node that are not being changed and all of the new key-value/pointer pairs that are being written. A single RDMA write (1125) is then performed to write the entire node with all of the existing key-value/pointer pairs in the node that are not being changed and all of the new key-value/pointer pairs along with the new checksum in the metadata. Once this write is complete, the B-Tree based key-value store application releases (1130) the reservation of the node by performing either an RDMA CAS operation or an RDMA write on the reservation bit associated with that node to flip the bit back to indicate that the node is no longer reserved.

Figure 12:
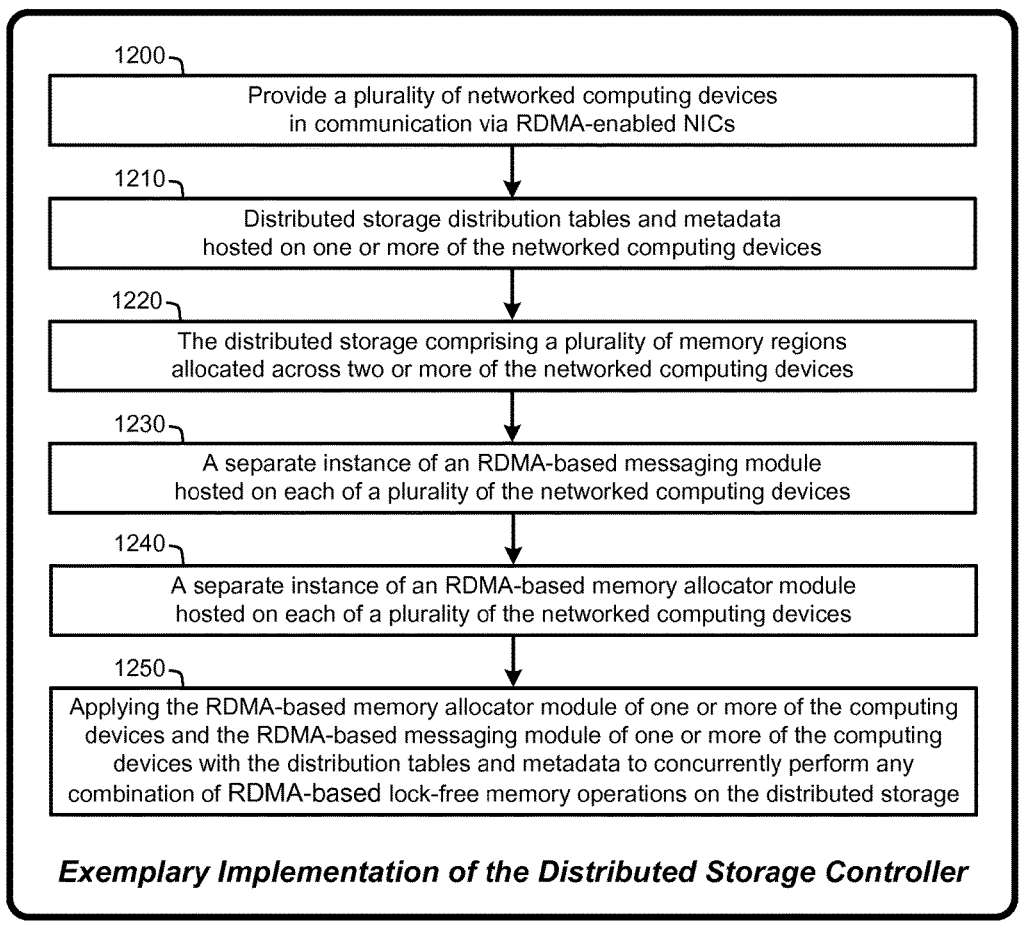
FIG. 12 illustrates an exemplary implementation of the RDMA-based Distributed Storage Controller.
Figure 13:
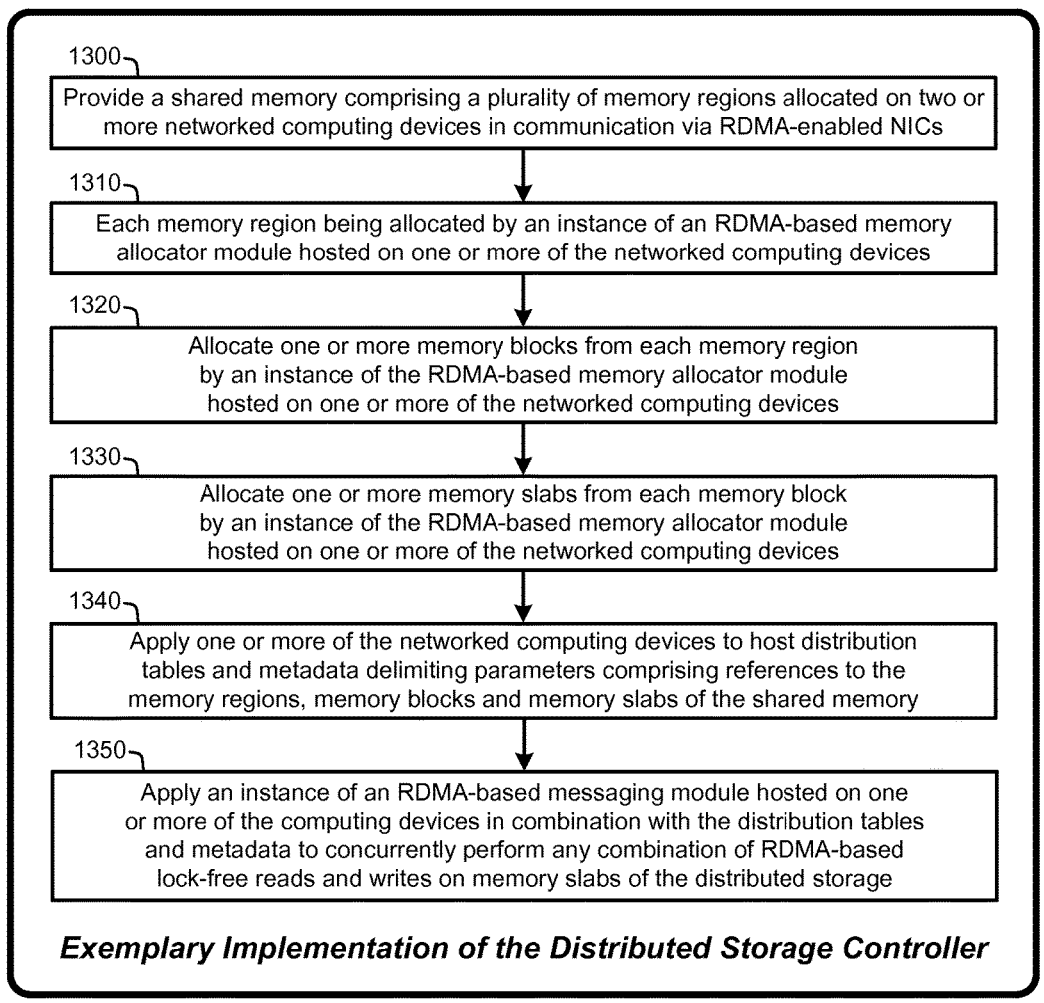
FIG. 13 illustrates an exemplary implementation of the RDMA-based Distributed Storage Controller.
Figure 14:
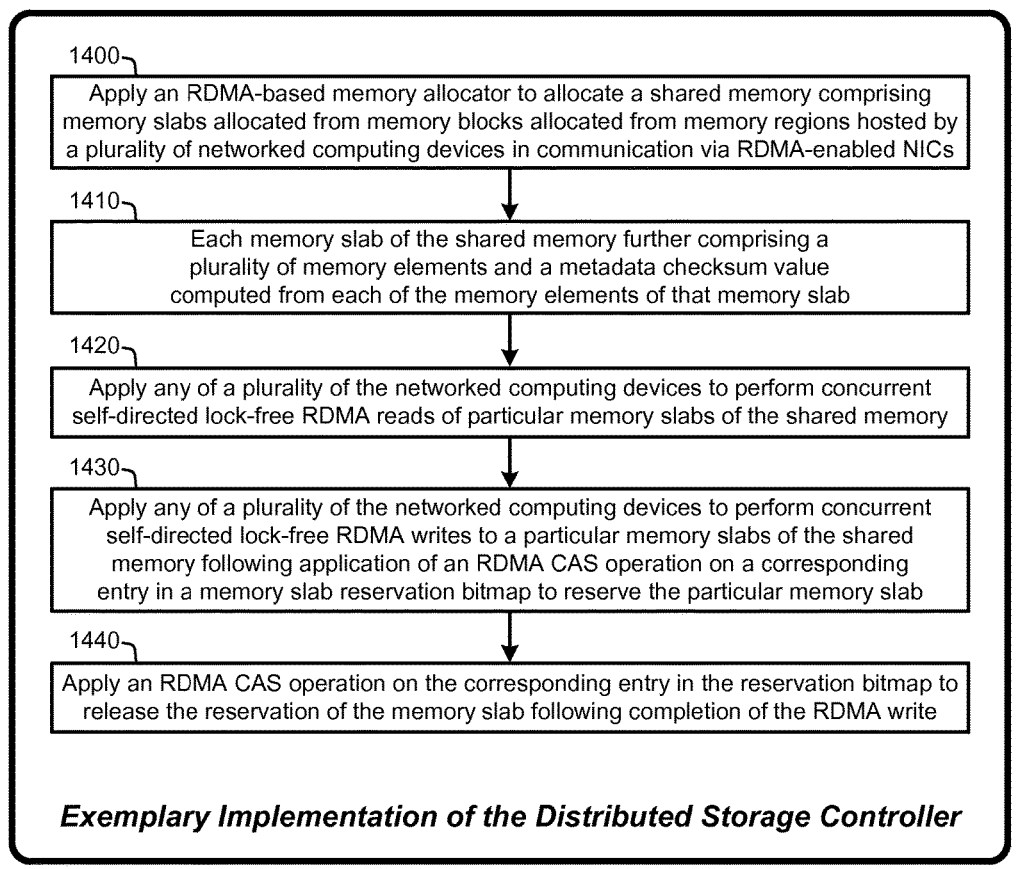
FIG. 14 illustrates an exemplary implementation of the RDMA-based Distributed Storage Controller.

3.0 Operational Summary of the Distributed Storage Controller:

The processes described above with respect to FIG. 1 through FIG. 11, and in further view of the detailed description provided above in Sections 1 and 2, are illustrated by the general operational flow diagrams of FIG. 12 through FIG. 14. In particular, FIG. 12 through FIG. 14 provide exemplary operational flow diagrams that summarizes the operation of some of the various implementations of the Distributed Storage Controller. FIG. 12 through FIG. 14 are not intended to provide an exhaustive representation of any or all of the various implementations of the Distributed Storage Controller described herein, and the implementations represented in these figures are provided only for purposes of explanation.

Further, any boxes and interconnections between boxes that may be represented by broken or dashed lines in FIG. 12 through FIG. 14 represent optional or alternate implementations of the Distributed Storage Controller described herein, and that any or all of these optional or alternate implementations, as described below, may be used in combination with other alternate implementations that are described throughout this document.

In general, as illustrated by FIG. 12, in various implementations, the Distributed Storage Controller begins operation by providing (1200) a plurality of networked computing devices in communication via RDMA-enabled NICs. In addition, distribution tables and metadata (1210) that define various parameters of a distributed storage are hosted on one or more of the networked computing devices. This distributed storage comprises (1220) a plurality of memory regions allocated across two or more of the networked computing devices. Further, a separate instance of an RDMA-based messaging module (1230) is hosted on each of a plurality of the networked computing devices. In addition, a separate instance of an RDMA-based memory allocator module (1240) is hosted on each of a plurality of the networked computing devices. The overall distributed storage is implemented by applying (1250) the RDMA-based memory allocator module of one or more of the computing devices and the RDMA-based messaging module of one or more of the computing devices in combination with the distribution tables and metadata to concurrently perform any combination of RDMA-based lock-free memory operations on the distributed storage.

Similarly, as illustrated by FIG. 13, in various implementations, the Distributed Storage Controller provides (1300) a shared memory comprising a plurality of memory regions allocated on two or more networked computing devices in communication via RDMA-enabled NICs. Each memory region of the shared memory is allocated (1310) by an instance of an RDMA-based memory allocator module hosted on one or more of the networked computing devices. In addition, one or more memory blocks are allocated (1320) from each memory region by an instance of the RDMA-based memory allocator module hosted on one or more of the networked computing devices. Further, one or more memory slabs are allocated (1330) from each memory block by an instance of the RDMA-based memory allocator module hosted on one or more of the networked computing devices. One or more of the networked computing devices are applied (1340) to host distribution tables and metadata delimiting parameters comprising references to the memory regions, memory blocks and memory slabs of the shared memory. In addition, an instance of an RDMA-based messaging module hosted on one or more of the computing devices is applied (1350) in combination with the distribution tables and metadata to concurrently perform any combination of RDMA-based lock-free reads and writes on memory slabs of the distributed storage.

Similarly, as illustrated by FIG. 14, in various implementations, the Distributed Storage Controller begins operation by applying (1400) an RDMA-based memory allocator to allocate a shared memory comprising memory slabs allocated from memory blocks allocated from memory regions hosted by a plurality of networked computing devices in communication via RDMA-enabled NICs. Each memory slab of the shared memory further comprises (1410) a plurality of memory elements and a metadata checksum value computed from each of the memory elements of that memory slab. In addition, any of a plurality of the networked computing devices are applied (1420) to perform concurrent self-directed lock-free RDMA reads of particular memory slabs of the shared memory. Further, any of a plurality of the networked computing devices are applied (1430) to perform concurrent self-directed lock-free RDMA writes to a particular memory slabs of the shared memory following application of an RDMA CAS operation on a corresponding entry in a memory slab reservation bitmap to reserve the particular memory slab. Finally, an RDMA CAS operation is applied (1440) on the corresponding entry in the reservation bitmap to release the reservation of the particular memory slab following completion of the RDMA write.

4.0 Exemplary Implementations:

The following paragraphs summarize various examples of implementations of the Distributed Storage Controller that may be claimed in the present document. The implementations summarized below are not intended to limit the subject matter that may be claimed in view of the detailed description of the Distributed Storage Controller. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, the Distributed Storage Controller applies an RDMA-based memory allocator to implement a distributed thread-safe and lock-free storage system in shared memory distributed across multiple networked computers. The Distributed Storage Controller enables any number of client applications, processes, subroutines, etc., on any number of networked computers to concurrently perform self-directed lock-free allocations, de-allocations, reads, writes, etc., on the shared memory via sequences of one-way RDMA messages (e.g., RDMA reads, RDMA writes, and RDMA atomic compare and swap (CAS) operations) without requiring CPU locks. As such, the CPUs of computing devices hosting the shared memory do not need to be notified of RDMA-based reads, writes or CAS operations on that memory. Consequently, CPU utilization for computing devices hosting any portion of the shared memory is minimal, thereby enabling the Distributed Storage Controller to scale to very large numbers of concurrent accesses by very large numbers of networked computing devices.

As a first example, in various implementations, a distributed storage system is implemented via means, processes or techniques comprising a plurality of networked computing devices in communication via RDMA-enabled NICs. In addition, distributed storage distribution tables and metadata hosted on one or more of the networked computing devices. This distributed storage comprises a plurality of memory regions allocated across two or more of the networked computing devices. Further, a separate instance of an RDMA-based messaging module hosted on each of a plurality of the networked computing devices. A separate instance of an RDMA-based memory allocator module is hosted on each of a plurality of the networked computing devices. Finally, the RDMA-based memory allocator module of one or more of the computing devices and the RDMA-based messaging module of one or more of the computing devices are applied in combination with the distribution tables and metadata to concurrently perform any combination of RDMA-based lock-free memory operations on the distributed storage.

As a second example, in various implementations, the first example is further modified via means, processes or techniques wherein the lock-free memory operations further comprise any combination of lock-free memory allocations, lock-free memory de allocations, lock-free memory reads and lock-free memory writes on the distributed storage.

As a third example, in various implementations, the second example is further modified via means, processes or techniques wherein the lock-free memory allocations further comprise applying an instance of the RDMA-based memory allocator module to allocate one or more of the memory regions on one or more of the networked computing devices via a sequence of RDMA messages, applying an instance of the RDMA-based memory allocator module to allocate one or more memory blocks from one or more of the memory regions via a sequence of RDMA messages, and applying an instance of the RDMA-based memory allocator module to allocate one or more memory slabs from one or more of the memory blocks via a sequence of RDMA messages.

As a fourth example, in various implementations, the third example is further modified via means, processes or techniques wherein each allocated memory region further comprises a metadata section comprising block headers and a free slab map.

As a fifth example, in various implementations, any of the third example and the fourth example are further modified via means, processes or techniques wherein each memory slab further comprises a slab metadata section including a slab checksum value computed from data held in a plurality of memory elements of the memory slab.

As a sixth example, in various implementations, any of the second example, the third example, the fourth example, and the fifth example are further modified via means, processes or techniques wherein the lock-free memory writes further comprise reserving a particular memory slab allocated from a corresponding memory region by performing an RDMA-based CAS operation to flip a bit of a corresponding entry in a memory reservation bitmap, and performing an RDMA-based write to the reserved memory slab.

As a seventh example, in various implementations, any of the second example, the third example, the fourth example, the fifth example, and the sixth example are further modified via means, processes or techniques wherein the lock-free memory reads further comprise performing an RDMA-based read operation on a particular memory slab of a particular memory region.

As an eighth example, in various implementations, any of the second example, the third example, the fourth example, the fifth example, the sixth example, and the seventh example, are further modified via means, processes or techniques further comprising a separate instance of a co-processor module hosted on one or more of the networked computing devices, wherein the co-processor module provides an interface for arbitrary client applications to the distributed storage via an instance of the RDMA-based memory allocator module and an instance of the RDMA-based messaging module.

As a ninth example, in various implementations, any of the second example, the third example, the fourth example, the fifth example, the sixth example, the seventh example, and the eighth example are further modified via means, processes or techniques further comprising applying the co-processor module to provide a B-Tree based key-value store in the distributed storage.

As a tenth example, in various implementations, any of the second example, the third example, the fourth example, the fifth example, the sixth example, the seventh example, the eighth example, and the ninth example are further modified via means, processes or techniques wherein any of the networked computing devices concurrently acts as any or all of a controller node for hosting the distribution tables and metadata of the distributed storage, a storage node for hosting a plurality of the memory regions of the distributed storage, and a client node for performing any combination of lock-free memory operations on the distributed storage.

As an eleventh example, in various implementations, a computer-implemented process is implemented via means, processes or techniques comprising a shared memory comprising a plurality of memory regions allocated on two or more networked computing devices in communication via RDMA-enabled NICs. Each memory region is allocated by an instance of an RDMA-based memory allocator module hosted on one or more of the networked computing devices. Further, one or more memory blocks being allocated from each memory region by an instance of the RDMA-based memory allocator module hosted on one or more of the networked computing devices. In addition, one or more memory slabs is allocated from each memory block by an instance of the RDMA-based memory allocator module hosted on one or more of the networked computing devices. This process also applies one or more of the networked computing devices to host distribution tables and metadata delimiting parameters comprising references to the memory regions, memory blocks and memory slabs of the shared memory. Further, this process also applies an instance of an RDMA-based messaging module hosted on one or more of the computing devices in combination with the distribution tables and metadata to concurrently perform any combination of RDMA-based lock-free reads and writes on memory slabs of the distributed storage.

As a twelfth example, in various implementations, the eleventh example is further modified via means, processes or techniques wherein each RDMA-based lock-free write further comprises applying an RDMA CAS operation on a corresponding entry in a memory slab reservation bitmap to reserve the particular memory slab, applying an RDMA write operation on the particular memory slab following the reservation, and applying an RDMA CAS operation on the corresponding entry in the reservation bitmap to release the reservation of the particular node following the RDMA write.

As a thirteenth example, in various implementations, any of the eleventh example and the twelfth example are further modified via means, processes or techniques wherein each memory slab further comprises a metadata section comprising a checksum value computed from a combination of the data in each memory element of that memory slab.

As a fourteenth example, in various implementations, the thirteenth example is further modified via means, processes or technique wherein each RDMA-based lock-free read further comprises applying an RDMA read operation to read a particular memory slab, computing a checksum from a combination of the data in each memory element of that memory slab, comparing the computed checksum to the checksum in the metadata section of the memory slab, and repeating the read of the memory slab and computation of the checksum until the computed checksum value matches the checksum value in the metadata of the memory slab.

As a fifteenth example, in various implementations, any of the eleventh example, the twelfth example, the thirteenth example and the fourteenth example are further modified via means, processes or techniques further comprising hosting a separate instance of a co-processor module on one or more of the networked computing devices, and applying the co-processor module to provide an interface for arbitrary client applications to the shared memory via an instance of the RDMA-based memory allocator module and an instance of the RDMA-based messaging module.

As a sixteenth example, in various implementations, any of the eleventh example, the twelfth example, the thirteenth example, the fourteenth example and the fifteenth example are further modified via means, processes or techniques wherein any of the networked computing devices concurrently acts as any or all of a controller node for hosting the distribution tables and metadata of the shared memory, a storage node for hosting a plurality of the memory regions of the shared memory, and a client node for performing any combination of lock-free memory operations on the shared memory.

As a seventh example, in various implementations, a computer-readable storage device having computer executable instructions that cause a computing device to execute a method is implemented via means, processes or techniques for applying an RDMA-based memory allocator to allocate a shared memory comprising memory slabs allocated from memory blocks allocated from memory regions hosted by a plurality of networked computing devices in communication via RDMA-enabled NICs. In addition, each memory slab of the shared memory further comprising a plurality of memory elements and a metadata checksum value computed from each of the memory elements of that memory slab. Further, this method applies any of a plurality of the networked computing devices to perform concurrent self-directed lock-free RDMA reads of particular memory slabs of the shared memory. In addition, this method applies any of a plurality of the networked computing devices to perform concurrent self-directed lock-free RDMA writes to a particular memory slabs of the shared memory following application of an RDMA CAS operation on a corresponding entry in a memory slab reservation bitmap to reserve the particular memory slab. Finally, this method applies an RDMA CAS operation on the corresponding entry in the reservation bitmap to release the reservation of the particular memory slab following completion of the RDMA write.

As an eighteenth example, in various implementations, the seventeenth example is further modified via means, processes or techniques wherein any concurrent self-directed RDMA read of any memory slab further comprises applying an RDMA read operation to read a particular memory slab, computing a checksum from a combination of the data in each memory element of that memory slab, comparing the computed checksum to the metadata checksum value of the memory slab, and repeating the read of the memory slab and computation of the checksum until the computed checksum value matches the metadata checksum value.

As an nineteenth example, in various implementations, any of the seventeenth example and the eighteenth example are further modified via means, processes or techniques further comprising hosting a separate instance of a co-processor module on one or more of the networked computing devices, and applying the co-processor module to provide an interface for arbitrary client applications to the shared memory via an instance of the RDMA-based memory allocator module and an instance of an RDMA-based messaging module hosted on one or more of the networked computing devices.

As an twentieth example, in various implementations, any of the seventeenth example, the eighteenth example and the nineteenth example are further modified via means, processes or techniques wherein any of the networked computing devices concurrently acts as any or all of a controller node for hosting distribution tables and metadata of the shared memory, a storage node for hosting a plurality of the memory regions of the shared memory, and a client node for performing any combination of lock-free memory operations on the shared memory.

Figure 15:
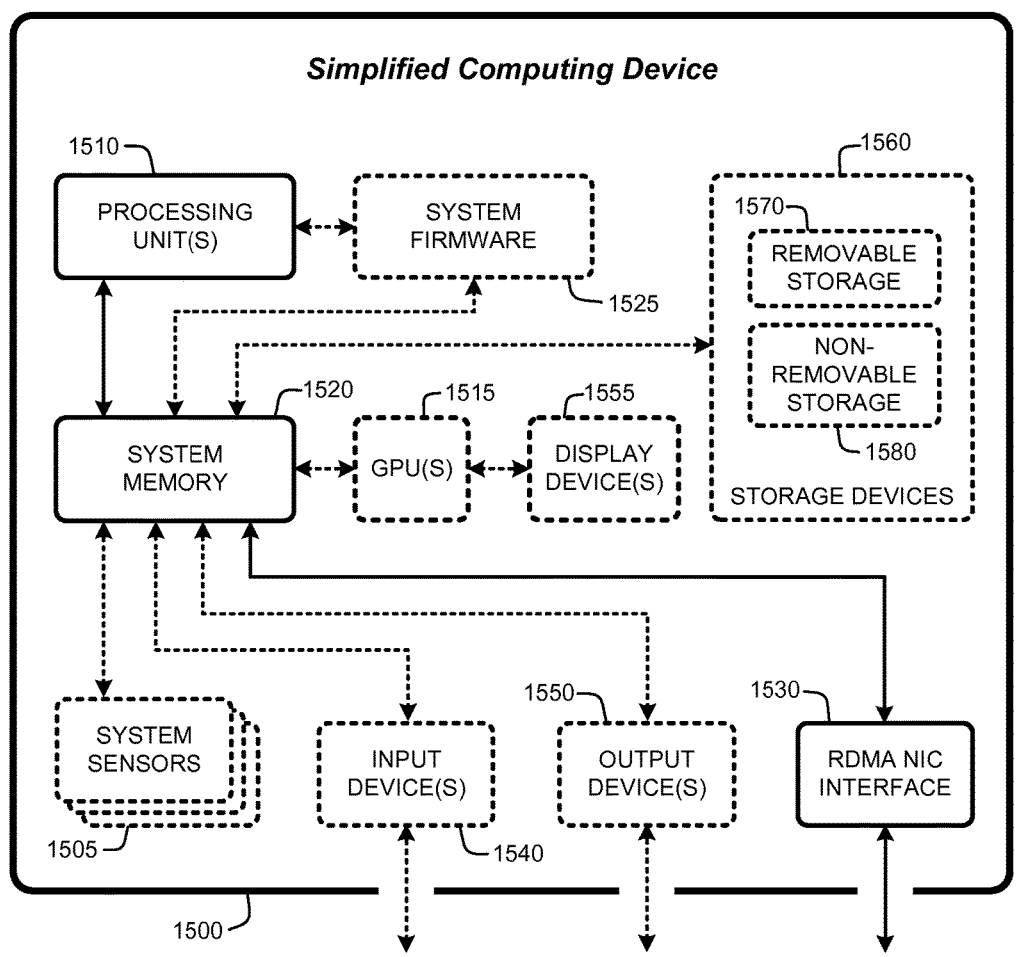
FIG. 15 is a general system diagram depicting a simplified general-purpose computing device having simplified computing and I/O capabilities for use in effecting various implementations of the Distributed Storage Controller, as described herein.

5.0 Exemplary Operating Environments:

The Distributed Storage Controller implementations described herein are operational within numerous types of general purpose or special purpose computing system environments or configurations. FIG. 15 illustrates a simplified example of a general-purpose computer system on which various implementations and elements of the Distributed Storage Controller, as described herein, may be implemented. Any boxes that are represented by broken or dashed lines in the simplified computing device 1500 shown in FIG. 15 represent alternate implementations of the simplified computing device. As described below, any or all of these alternate implementations may be used in combination with other alternate implementations that are described throughout this document.

The simplified computing device 1500 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Distributed Storage Controller implementations described herein, the device should have a sufficient computational capability and system memory to enable basic computational operations. In particular, the computational capability of the simplified computing device 1500 shown in FIG. 15 is generally illustrated by one or more processing unit(s) 1510, and may also include one or more graphics processing units (GPUs) 1515, either or both in communication with system memory 1520. The processing unit(s) 1510 of the simplified computing device 1500 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 1500 may also include other components, such as, for example, a network interface controller 1530. The simplified computing device 1500 may also include one or more conventional computer input devices 1540 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 1500 and with any other component or feature of the Distributed Storage Controller, including input, output, control, feedback, and response to one or more users or other devices or systems associated with the Distributed Storage Controller, are enabled by a variety of Natural User Interface (NUI) scenarios. The NUI techniques and scenarios enabled by the Distributed Storage Controller include, but are not limited to, interface technologies that allow one or more users user to interact with the Distributed Storage Controller in a "natural" manner, free from artificial constraints imposed by input devices such as mice, keyboards, remote controls, and the like.

Such NUI implementations are enabled by the use of various NUI techniques including, but not limited to, using NUI information derived from user speech or vocalizations captured via microphones or other input devices 1540 or system sensors 1505. Such NUI implementations are also enabled by the use of various techniques including, but not limited to, information derived from system sensors 1505 or other input devices 1540 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices.

Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Distributed Storage Controller.

However, the aforementioned exemplary NUI scenarios may be further augmented by combining the use of artificial constraints or additional signals with any combination of NUI inputs. Such artificial constraints or additional signals may be imposed or generated by input devices 1540 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Distributed Storage Controller.

The simplified computing device 1500 may also include other optional components such as one or more conventional computer output devices 1550 (e.g., display device(s) 1555, audio output devices, video output devices, devices for transmitting wired or wireless data transmissions, and the like). Typical network interface controllers (NICs) 1530, input devices 1540, output devices 1550, and storage devices 1560 for general-purpose computers are well known to those skilled in the art, and will not be described in detail herein.

The simplified computing device 1500 shown in FIG. 15 may also include a variety of computer-readable media. Computer-readable media can be any available media that can be accessed by the computing device 1500 via storage devices 1560, and include both volatile and nonvolatile media that is either removable 1570 and/or non-removable 1580, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information or content delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Distributed Storage Controller implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 1525, hardware, or any combination thereof to control a computer to implement the disclosed subject matter. The term "article of manufacture" as used herein is intended to encompass a computer program accessible from any computer-readable device, or media.

The Distributed Storage Controller implementations described herein may be further described in the general context of computer-executable instructions, such as program modules, being executed by a computing device. Generally, program modules include routines, programs, objects, components, data structures, and the like, that perform particular tasks or implement particular abstract data types. The Distributed Storage Controller implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations:

The foregoing description of the Distributed Storage Controller has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the Distributed Storage Controller. It is intended that the scope of the Distributed Storage Controller be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Distributed Storage Controller described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A distributed storage system, comprising:
   a plurality of networked computing devices in communication via RDMA-enabled NICs;
   distribution tables and metadata hosted on one or more of the networked computing devices;
   a plurality of memory regions allocated across two or more of the networked computing devices;
   a separate instance of an RDMA-based messaging module hosted on each of a plurality of the networked computing devices;
   a separate instance of an RDMA-based memory allocator module hosted on each of a plurality of the networked computing devices, each RDMA-based memory allocator module configured to perform allocations and de-allocations of shared memory on any of the networked computing devices; and
   applying the RDMA-based memory allocator module of one or more of the networked computing devices and the RDMA-based messaging module of one or more of the networked computing devices in combination with the distribution tables and metadata to concurrently perform any combination of RDMA-based lock-free memory operations on one or more of the plurality of memory regions.

2. The system of claim 1 wherein the lock-free memory operations further comprise any combination of lock-free memory allocations, lock-free memory de-allocations, lock-free memory reads and lock-free memory writes on the distributed storage.

3. The system of claim 2 wherein the lock-free memory allocations further comprise:
   applying an instance of the RDMA-based memory allocator module to allocate one or more of the memory regions on one or more of the networked computing devices via a sequence of RDMA messages;
   applying an instance of the RDMA-based memory allocator module to allocate one or more memory blocks from one or more of the memory regions via a sequence of RDMA messages; and
   applying an instance of the RDMA-based memory allocator module to allocate one or more memory slabs from one or more of the memory blocks via a sequence of RDMA messages.

4. The system of claim 3 wherein each allocated memory region further comprises a metadata section comprising block headers and a free slab map.

5. The system of claim 3 wherein each memory slab further comprises a slab metadata section including a slab checksum value computed from data held in a plurality of memory elements of the memory slab.

6. The system of claim 2 wherein the lock-free memory writes further comprise:
   reserving a particular memory slab allocated from a corresponding memory region by performing an RDMA-based CAS operation to flip a bit of a corresponding entry in a memory reservation bitmap; and
   performing an RDMA-based write to the reserved memory slab.

7. The system of claim 2 wherein the lock-free memory reads further comprise performing an RDMA-based read operation on a particular memory slab of a particular memory region.

8. The system of claim 1 further comprising:
   a separate instance of a co-processor module hosted on one or more of the networked computing devices;
   the co-processor module providing an interface for arbitrary client applications to the distributed storage via an instance of the RDMA-based memory allocator module and an instance of the RDMA-based messaging module.

9. The system of claim 8 further comprising applying the co-processor module to provide a B-Tree based key-value store in the distributed storage.

10. The system of claim 1 wherein any of the networked computing devices concurrently acts as any or all of a controller node for hosting the distribution tables and metadata of the distributed storage, a storage node for hosting a plurality of the memory regions of the distributed storage, and a client node for performing any combination of lock-free memory operations on the distributed storage.

11. A computer-implemented process, comprising:
   a shared memory comprising a plurality of memory regions allocated on two or more networked computing devices in communication via RDMA-enabled NICs;
   a separate instance of an RDMA-based memory allocator module hosted on each of a plurality of the networked computing devices, each RDMA-based memory allocator module configured to perform allocations and de-allocations of shared memory on any of the networked computing devices;
   each memory region being allocated by an instance of the RDMA-based memory allocator module hosted on one or more of the networked computing devices;
   one or more memory blocks being allocated from each memory region by an instance of the RDMA-based memory allocator module hosted on one or more of the networked computing devices;
   one or more memory slabs being allocated from each memory block by an instance of the RDMA-based memory allocator module hosted on one or more of the networked computing devices;
   applying one or more of the networked computing devices to host distribution tables and metadata delimiting parameters comprising references to the memory regions, memory blocks and memory slabs of the shared memory; and
   applying an instance of the RDMA-based messaging module hosted on one or more of the networked computing devices in combination with the distribution tables and metadata to concurrently perform any combination of RDMA-based lock-free reads and writes on one or more of the memory slabs.

12. The computer-implemented process of claim 11 wherein each RDMA-based lock-free write further comprises:
applying an RDMA CAS operation on a corresponding entry in a memory slab reservation bitmap to reserve the particular memory slab;
applying an RDMA write operation on the particular memory slab following the reservation; and
applying an RDMA CAS operation on the corresponding entry in the reservation bitmap to release the reservation of the particular node following the RDMA write.

13. The computer-implemented process of claim 11 wherein each memory slab further comprises a metadata section comprising a checksum value computed from a combination of the data in each memory element of that memory slab.

14. The computer-implemented process of claim 13 wherein each RDMA-based lock-free read further comprises:
applying an RDMA read operation to read a particular memory slab;
computing a checksum from a combination of the data in each memory element of that memory slab;
comparing the computed checksum to the checksum in the metadata section of the memory slab; and
repeating the read of the memory slab and computation of the checksum until the computed checksum value matches the checksum value in the metadata of the memory slab.

15. The computer-implemented process of claim 11 further comprising:
hosting a separate instance of a co-processor module on one or more of the networked computing devices; and
applying the co-processor module to provide an interface for arbitrary client applications to the shared memory via an instance of the RDMA-based memory allocator module and an instance of the RDMA-based messaging module.

16. The computer-implemented process of claim 11 wherein any of the networked computing devices concurrently acts as any or all of a controller node for hosting the distribution tables and metadata of the shared memory, a storage node for hosting a plurality of the memory regions of the shared memory, and a client node for performing any combination of lock-free memory operations on the shared memory.

17. A computer-readable storage device having computer executable instructions stored therein, said instructions causing a computing device to execute a method comprising:
applying an instance of an RDMA-based memory allocator to allocate a shared memory comprising memory slabs allocated from memory blocks allocated from memory regions hosted by a plurality of networked computing devices in communication via RDMA-enabled NICs, each of the plurality of networked computing devices hosting a separate instance of the RDMA-based memory allocator configured to perform allocations and de-allocations of shared memory on any of the networked computing devices;
each memory slab of the shared memory further comprising a plurality of memory elements and a metadata checksum value computed from each of the memory elements of that memory slab;
applying any of a plurality of the networked computing devices to perform concurrent self-directed lock-free RDMA reads of particular memory slabs of the shared memory;
applying any of a plurality of the networked computing devices to perform concurrent self-directed lock-free RDMA writes to a particular memory slabs of the shared memory following application of an RDMA CAS operation on a corresponding entry in a memory slab reservation bitmap to reserve the particular memory slab; and
applying an RDMA CAS operation on the corresponding entry in the reservation bitmap to release the reservation of the particular memory slab following completion of the RDMA write.

18. The computer-readable storage device of claim 17 wherein any concurrent self-directed RDMA read of any memory slab further comprises:
applying an RDMA read operation to read a particular memory slab;
computing a checksum from a combination of the data in each memory element of that memory slab;
comparing the computed checksum to the metadata checksum value of the memory slab; and
repeating the read of the memory slab and computation of the checksum until the computed checksum value matches the metadata checksum value.

19. The computer-readable storage device of claim 17 further comprising:
hosting a separate instance of a co-processor module on one or more of the networked computing devices; and
applying the co-processor module to provide an interface for arbitrary client applications to the shared memory via an instance of the RDMA-based memory allocator module and an instance of an RDMA-based messaging module hosted on one or more of the networked computing devices.

20. The computer-readable storage device of claim 17 wherein any of the networked computing devices concurrently acts as any or all of a controller node for hosting distribution tables and metadata of the shared memory, a storage node for hosting a plurality of the memory regions of the shared memory, and a client node for performing any combination of lock-free memory operations on the shared memory.

* * * * *